(12) United States Patent
Starkweather et al.

(10) Patent No.: US 9,696,035 B2
(45) Date of Patent: Jul. 4, 2017

(54) METHOD OF FORMING A COOLING HOLE BY LASER DRILLING

(71) Applicant: General Electric Company, Schenectady, NY (US)

(72) Inventors: John Howard Starkweather, Cincinnati, OH (US); William Bennett, Forest Park, OH (US); John Gibbons, Clinton, IN (US); Anthony Urbanski, Terre Haute, IN (US)

(73) Assignee: General Electric Company, Schenectady, NY (US)

( * ) Notice: Subject to any disclaimer, the term of this patent is extended or adjusted under 35 U.S.C. 154(b) by 726 days.

(21) Appl. No.: 13/875,150

(22) Filed: May 1, 2013

(65) Prior Publication Data

US 2013/0269354 A1 Oct. 17, 2013

Related U.S. Application Data

(63) Continuation-in-part of application No. 12/916,099, filed on Oct. 29, 2010, now abandoned.

(51) Int. Cl.
*B23K 26/388* (2014.01)
*B23K 26/384* (2014.01)
(Continued)

(52) U.S. Cl.
CPC .......... *F23R 3/002* (2013.01); *B23K 26/006* (2013.01); *B23K 26/0622* (2015.10);
(Continued)

(58) Field of Classification Search
CPC B23K 26/006; B23K 26/0622; B23K 26/388; B23K 26/389; B23K 26/062; B23K 26/384
See application file for complete search history.

(56) References Cited

U.S. PATENT DOCUMENTS 5,000,005 A 3/1991 Kwan et al.
5,096,379 A * 3/1992 Stroud ................. B23K 26/388
29/889.721
(Continued)

FOREIGN PATENT DOCUMENTS

CN 1272593 A 11/2000
EP 1308236 A1 5/2003
(Continued)

OTHER PUBLICATIONS

International Search Report and Written Opinion issued in connection with related PCT Application No. PCT/US2011/049283 dated Jul. 12, 2013.
(Continued)

*Primary Examiner* — Geoffrey S Evans
(74) *Attorney, Agent, or Firm* — General Electric Company; Brian P. Overbeck

(57) ABSTRACT

A method for making shaped cooling holes in a substrate by pulsing and stopping a laser while moving the laser or substrate. The method produces shaped cooling holes with a bore angled relative to an exit surface of the combustor liner. One end of the bore is an inlet formed in an inlet surface of the combustor liner. The other end of the bore is an outlet formed in the exit surface of the combustor liner. The outlet has a shaped portion that expands in only one dimension.

3 Claims, 20 Drawing Sheets

(51) Int. Cl.
*F23R 3/00* (2006.01)
*F23M 5/08* (2006.01)
*F23R 3/04* (2006.01)
*F23R 3/06* (2006.01)
*B23K 26/00* (2014.01)
*B23K 26/0622* (2014.01)
*B23K 26/382* (2014.01)

(52) U.S. Cl.
CPC .......... *B23K 26/384* (2015.10); *B23K 26/388* (2013.01); *B23K 26/389* (2015.10); *F23M 5/08* (2013.01); *F23R 3/04* (2013.01); *F23R 3/06* (2013.01); *F23R 2900/00018* (2013.01); *F23R 2900/03041* (2013.01); *Y02T 50/675* (2013.01)

(56) References Cited

U.S. PATENT DOCUMENTS

| | | | |
|---|---|---|---|
| 5,181,379 A | 1/1993 | Wakeman et al. | |
| 5,241,827 A | 9/1993 | Lampes | |
| 5,261,223 A | 11/1993 | Foltz | |
| 5,382,133 A | 1/1995 | Moore et al. | |
| 5,609,779 A | 3/1997 | Crow et al. | |
| 5,758,504 A | 6/1998 | Abreu et al. | |
| 5,771,577 A | 6/1998 | Gupta et al. | |
| 6,210,488 B1 | 4/2001 | Bruce | |
| 6,243,948 B1* | 6/2001 | Lee | B23P 6/002 29/889.721 |
| 6,329,015 B1 | 12/2001 | Fehrenbach et al. | |
| 6,383,602 B1 | 5/2002 | Fric et al. | |
| 6,420,677 B1* | 7/2002 | Emer | B23K 26/40 219/121.71 |
| 6,655,149 B2 | 12/2003 | Farmer et al. | |
| 7,019,257 B2* | 3/2006 | Stevens | B23K 26/388 219/121.7 |
| 7,057,133 B2* | 6/2006 | Lei | H01L 21/76898 219/121.71 |
| 8,153,923 B2 | 4/2012 | Beck et al. | |
| 8,157,526 B2 | 4/2012 | Beck et al. | |
| 8,245,519 B1 | 8/2012 | Liang | |
| 2008/0197120 A1* | 8/2008 | Beck | B23K 26/0604 219/121.71 |
| 2009/0057279 A1* | 3/2009 | Garry | B23K 26/388 219/121.67 |
| 2009/0272124 A1 | 11/2009 | Dawson et al. | |
| 2010/0115967 A1 | 5/2010 | Maltson | |
| 2010/0126973 A1* | 5/2010 | Frye | B23K 26/0823 219/121.71 |
| 2011/0272387 A1* | 11/2011 | Massa | B23K 26/388 219/121.71 |
| 2013/0020291 A1* | 1/2013 | Elfizy | B23K 26/388 219/121.71 |
| 2013/0269354 A1 | 10/2013 | Starkweather et al. | |

FOREIGN PATENT DOCUMENTS

| | | |
|---|---|---|
| EP | 1419847 A1 | 5/2004 |
| EP | 1967696 A1 | 9/2008 |
| EP | 1970628 A2 | 9/2008 |
| EP | 2241813 A2 | 10/2010 |
| EP | 2554792 A1 | 2/2013 |
| JP | 63-160779 A * | 7/1988 |
| JP | 07158403 A | 6/1995 |
| WO | 2012057908 A2 | 5/2012 |

OTHER PUBLICATIONS

Non-Final Rejection towards related U.S. Appl. No. 12/916,099 dated Dec. 16, 2013.

Unofficial English translation of Office Action issued in connection with related CN Application No. 201180052208.2 on Sep. 29, 2014.

Unofficial English translation of Office Action issued in connection with corresponding CN Application No. 201410181607.4 on Jul. 28, 2015.

Andreini, A., Bianchini, C. Ceccherini, A., Facchini, B., Mangani, L., Cinque, G., Colantuoni, S.; "Investigation of Circular and Shaped Effusion Cooling Arrays for Combustor Liner Application—Part 2: Numerical Analysis"; Proceedings of ASME Turbo Expo 2009: Power for Land, Sea and Air GT2009; Jun. 8-12, 2009; Orlando, Florida, USA.

Facchini, Bruno; Tarchi, Lorenzo; Toni, Lorenzo; Cinque, Giuseppe; Colantuoni, Salvatore; "Investigation of Circular and Shaped Effusion Cooling Arrays for Combustor Liner Application—Part 1: Experimental Analysis"; Proceedings of ASME Turbo Expo 2009: Power for Land, Sea and Air GT2009; Jun. 8-12, 2009; Orlando, Florida, USA.

European Search Report and Written Opinion issued in connection with corresponding EP Application No. 14166218.9-1605 dated Mar. 5, 2015.

Dhar et al., "A review on laser drilling and its Techniques", Proceedings: International Conference on Advances in Mechanical Engineering, Dec. 1, 2006.

Unofficial English Translation of Japanese Office Action issued in connection with corresponding JP Application No. 2014-092185 on Mar. 17, 2015.

* cited by examiner

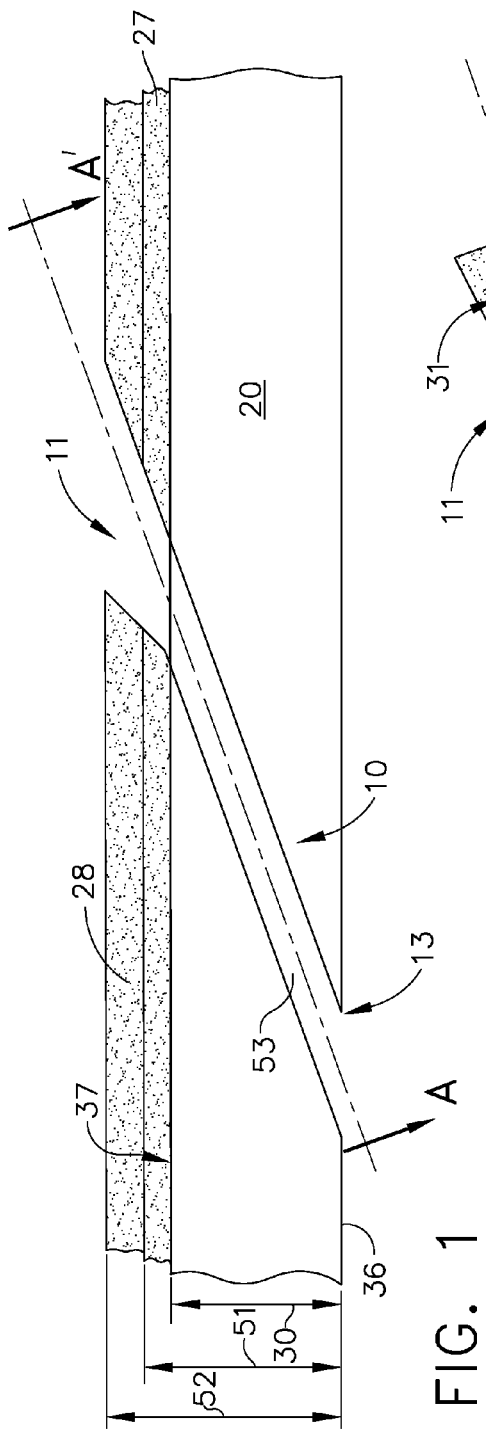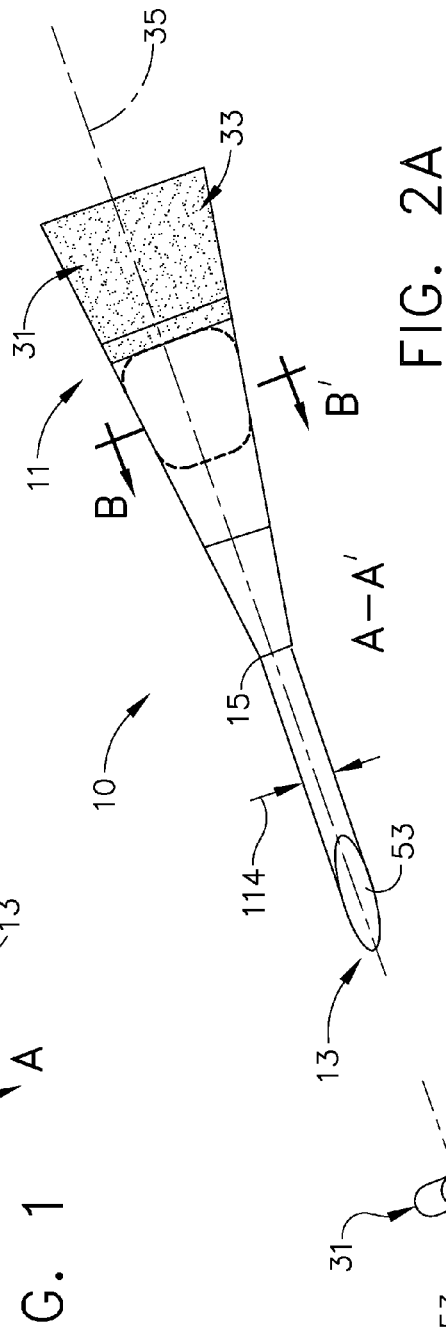

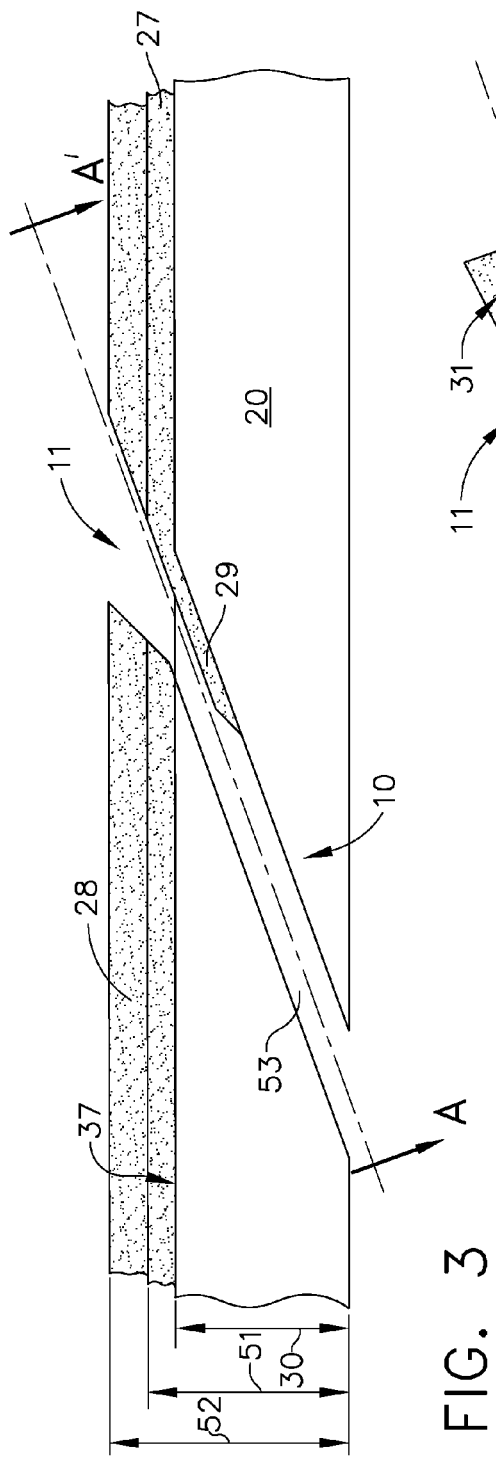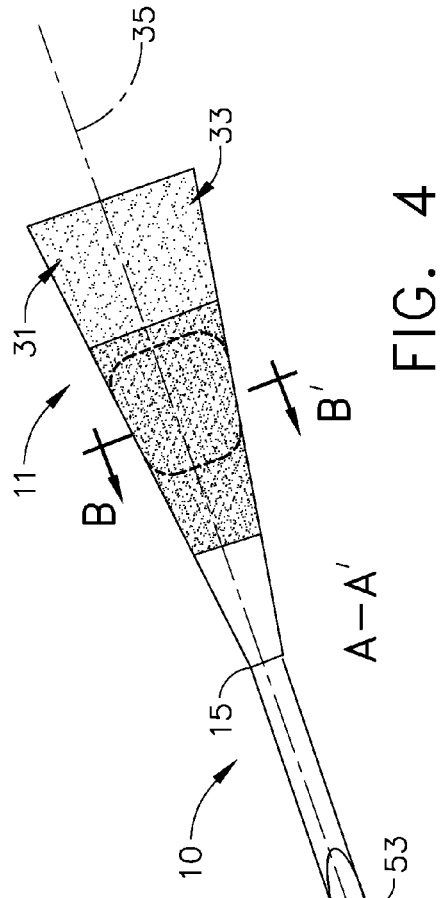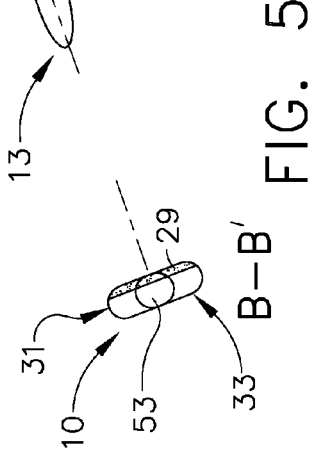

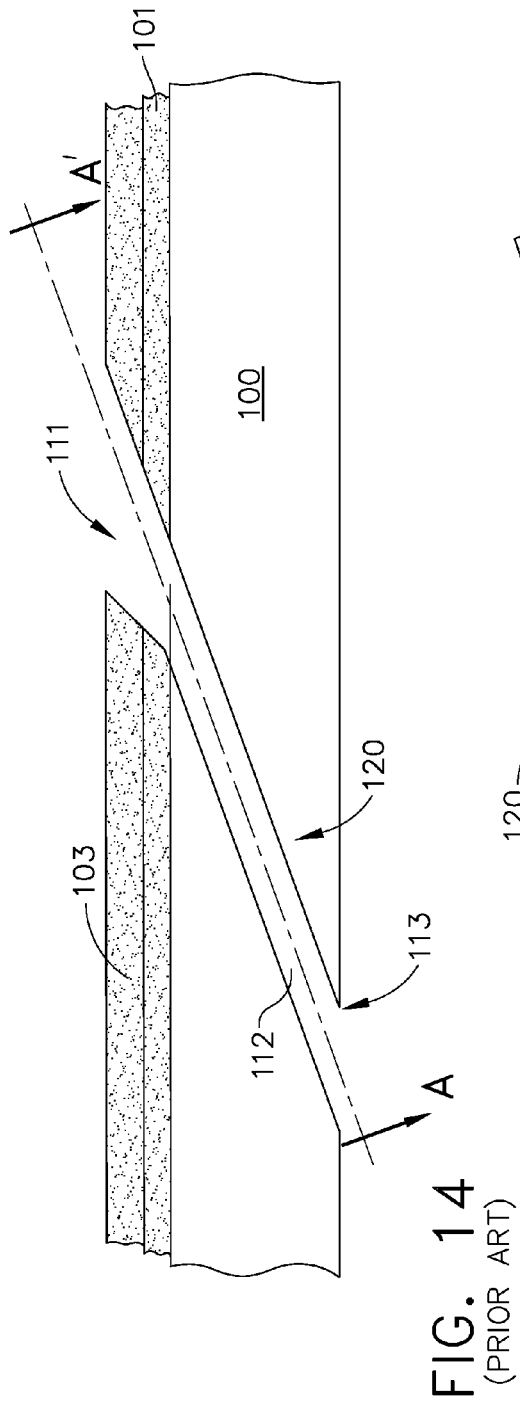
FIG. 14 (PRIOR ART)
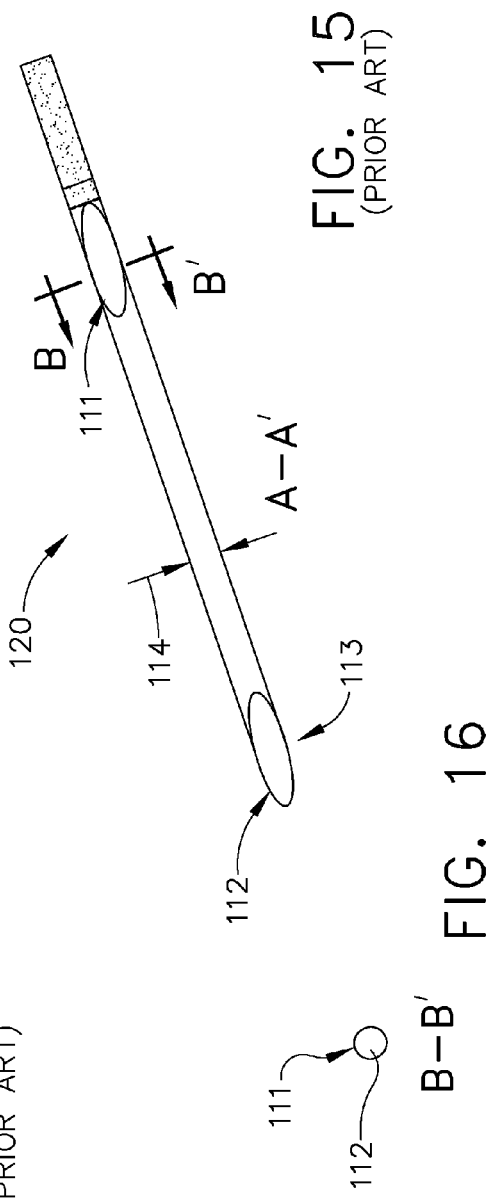
FIG. 15 (PRIOR ART)
FIG. 16 (PRIOR ART)

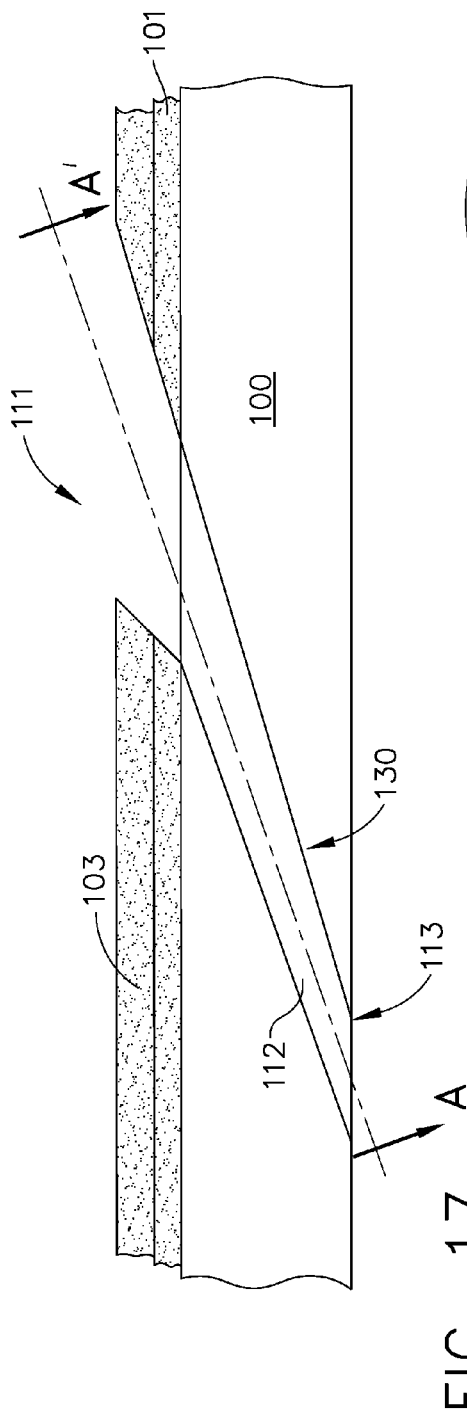
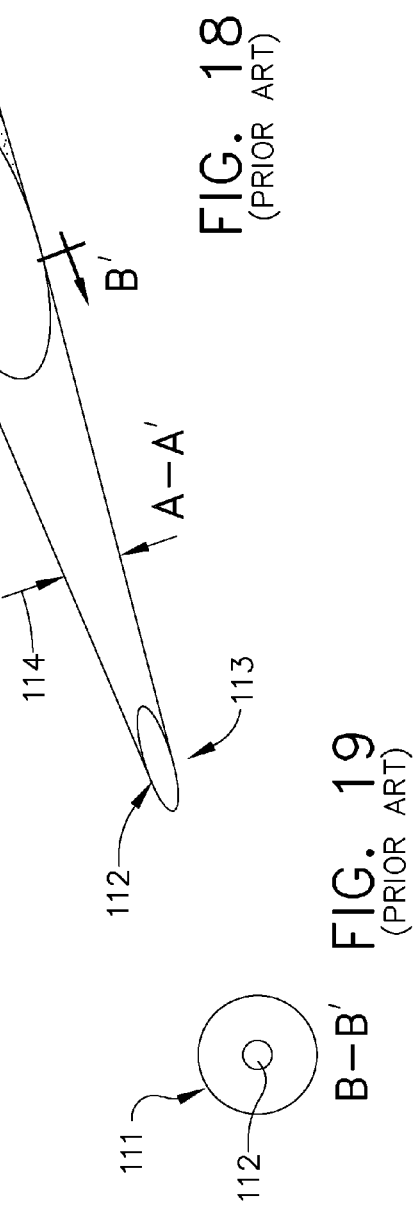
FIG. 17 (PRIOR ART)
FIG. 18 (PRIOR ART)
FIG. 19 (PRIOR ART)

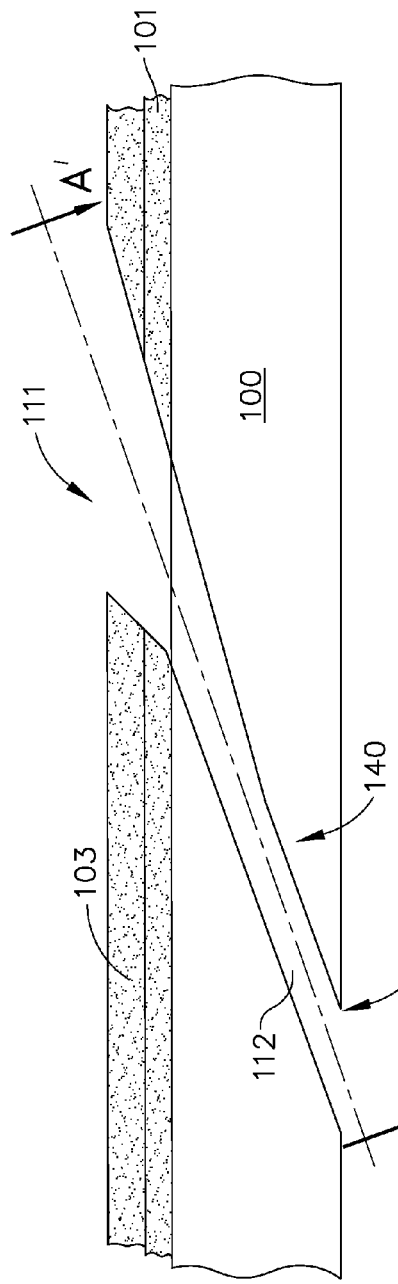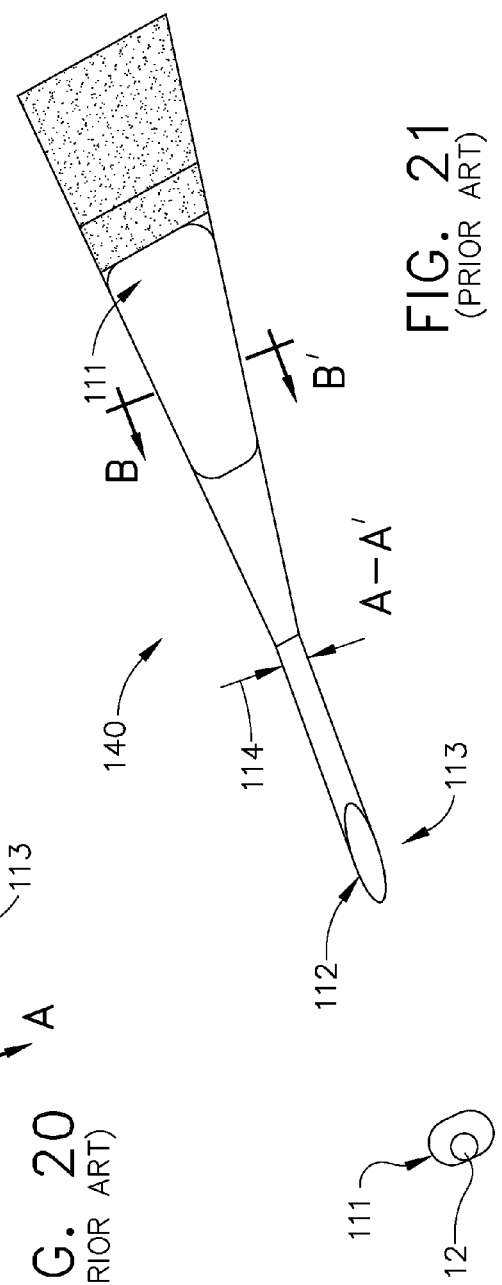

US 9,696,035 B2

METHOD OF FORMING A COOLING HOLE BY LASER DRILLING

CROSS-REFERENCE TO RELATED APPLICATIONS

This application is a Continuation-In-Part which claims the benefit of, under and from 35 USC §120, to currently pending U.S. patent application Ser. No. 12/916,099, filed Oct. 29, 2010 by Starkweather.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

Field of the Invention

The field of the invention relates to turbines generally, and more particularly to certain new and useful advances in the manufacture and/or cooling of gas turbine combustor liners, of which the following is a specification, reference being had to the drawings accompanying and forming a part of the same.

Description of Related Art

A combustor of a gas turbine is a component or area thereof in which combustion of fuel occurs, and which affects various engine characteristics, including emissions and/or fuel efficiency. The purpose of combustors is to regulate the combustion of fuel and air to produce energy in the form of high-temperature gases, which can rotate an engine or generator turbine and/or be routed through an exhaust nozzle. Combustors are subject to various design considerations, which include, but are not limited to: maintaining a uniform exit temperature profile so that hot spots do not damage the turbine or the combustor, and operating with low emission of pollutants. Accordingly, a combustor liner, which contains the combustion process and introduces various airflows into the combustion zone, is built to withstand high temperatures. Some combustor liners are insulated from heat by thermal barrier coatings ("TBCs"), but most rely on various types of air-cooling to reduce liner temperature. For example, film cooling injects a thin blanket of cool air over the interior of the combustor liner, while effusion cooling pushes cool air through a lattice formed of closely spaced, discrete pores, or holes, in the combustor liner. Of the two approaches, effusion cooling tends to use less air and to generate a more uniform temperature profile than film cooling.

FIG. 14 is a sectional side view of a substrate coated with a thermal barrier coating and having a conventional round cooling hole 120. FIG. 15 is another sectional view of the conventional round cooling hole 120 of FIG. 14, taken along the line A-A'. FIG. 16 is another sectional view of the conventional round cooling hole 120 of FIG. 15, taken along the line B-B'.

FIG. 17 is a sectional side view of a substrate coated with a thermal barrier coating and having a conventional conical film cooling hole 130. FIG. 18 is another sectional view of the conventional conical film cooling hole 130 of FIG. 17, taken along the line A-A'. FIG. 19 is another sectional view of the conventional conical film cooling hole 130 of FIG. 17, taken along the line B-B'.

FIG. 20 is a sectional side view of a substrate coated with a thermal barrier coating and having a conventional "3D" film cooling hole 140. FIG. 21 is another sectional view of the conventional "3D" film cooling hole 140 of FIG. 20, taken along the line A-A'. FIG. 22 is another sectional view of the conventional "3D" film cooling hole 140 of FIG. 20, taken along the line B-B'.

FIG. 23 is a sectional side view of a substrate coated with a thermal barrier coating and having a conventional "fan" film cooling hole 150. FIG. 24 is another sectional view of the conventional "fan" film cooling hole 150 of FIG. 23, taken along the line A-A'. FIG. 25 is another sectional view of the conventional "fan" film cooling hole 150 of FIG. 23, taken along the line B-B'.

Referring to FIGS. 15-25, each conventional cooling hole 120, 130, 140 and 150 is formed at an angle in a substrate 100. The substrate 100 is coated with a thermal barrier coating 101. The thermal barrier coating 101 is coated with a bond coat 103. Each cooling hole 120, 130, 140 and 150 has an inlet 113 formed on one side of the substrate 100 and a larger outlet 111 that is formed on the opposite side of the substrate 100. Each cooling hole 120 130, 140 and 150 has a bore 112 that communicates with and/or forms part of the inlet 113. The bore 112 is generally cylindrical. For the round cooling hole 120, the diameter 114 of the bore 112 is uniform between the inlet 113 and the outlet 112. For the cooling holes 130, 140 and 150, the diameter 114 of the bore 112 increases proximate the outlet 111.

However, each of the convention cooling holes 120, 130, 140 and 150 has at least one disadvantage. For example, analyses of the conical film cooling holes 130 and of the "fan" film cooling holes 150 has revealed drawbacks in convective cooling. As shown, the "3D" film cooling holes 140 have cylindrical bores 112 that transition to three-dimensional diffusion on all sides in the downstream direction. However, this type of effusion cooling arrangement tends to be unsuitable for combustor liners because such three-dimensional downstream diffusion removes a significant amount of thermal barrier coating ("TBC") from the combustor liner, a disadvantage in combustors where radiation is a substantial part of the heat load.

The practice in effusion cooling has been to limit the axial and radial spacing of multihole arrays to about 6.5 diameters to ensure the respective airflows coalesce into a continuous protective film and to ensure every location has bore convective cooling. This spacing implies a certain minimum cooling flow per unit area. However, as technology advances, there is a strong desire to reduce the cooling flow and free up air for reduced NOx emissions, increased efficiency, and/or better turbine cooling.

Similarly there has been a limit on the axial and tangential spacing of multihole arrays of 4 or 5 diameters minimum to avoid excessive stress concentrations. This spacing implies a certain maximum cooling flow per unit area. At certain locations, however, where the accumulation of film is disrupted by local flow characteristic within the combustor, there is a strong desire to locally increase the cooling flow to avoid low life of the liner. Enlarging the inlet metering hole in the direction of the sides gives the best supply of air to the shape wings and gives more bore cooling surface area than simply enlarging the metering hole diameter.

BRIEF SUMMARY OF THE INVENTION

Embodiments of a shaped cooling hole for use in effusion cooling components, such as combustor liners of gas turbines, with improved film effectiveness at little loss of bore convective cooling, together with methods for making the same, as herein shown, described and claimed. Various features and advantages of embodiments of the shaped cooling hole will become apparent by reference to the following description taken in connection with the accompanying drawings.

According to some embodiments, a combustor liner with shaped cooling apertures comprises a combustor liner having an inlet surface and an exit surface, an inlet having a first curvilinear segment, a second curvilinear segment and at least two linear segments, a bore extending from the inlet aperture toward the exit surface to a transition point, an outlet extending from the transition point to the exit surface, the outlet having a first curvilinear segment, a second curvilinear segment and at least two linear segments, the inlet having a first area and the outlet having a second area, wherein the second area is greater than the first area.

According to still further embodiments, an aircraft engine component with cooling aperture comprises a substrate adjacent an air flow, the substrate having an inlet surface, an outlet surface and a cooling aperture, the inlet surface having an inlet, the inlet defined by a first curvilinear segment, a second curvilinear segment and first and second linear segments extending between the first and second curvilinear segments, a bore extending from the inlet toward the outlet surface at a preselected angle, an outlet formed in the outlet surface defined by a first curvilinear segment, a second curvilinear segment and first and second linear segments extending between the first and second curvilinear segments, the inlet defining a first area and the outlet defining a second area, wherein the first area is less than the second area, and wherein the second area expands in a single dimension from the first area to the second area.

According to another embodiment a method of forming a shaped cooling hole in a combustor liner comprises drilling a center bore at a center location with a laser from an outlet toward an inlet, pulsing the laser a first time while moving the laser to a first side of the center bore, stopping the first pulsing and moving the laser to the center, pulsing the laser a second time while moving the laser to a second site of the center bore, stopping the second pulsing and moving the laser to said center, trepanning the laser, trepanning said laser to control size and shape of a cooling hole.

According to yet a further embodiment, a method of forming a cooling aperture, comprises drilling a center bore at a preselected angle from an exit surface toward an inlet surface through a substrate, pulsing the laser a first series while moving one of the laser and the substrate in a first direction relative to a center line of the bore, stopping the pulsing the laser the first series and moving the one of the laser and the substrate, pulsing the laser and second series while moving the one of the laser and the substrate in a second direction relative to the center line of the bore, stopping the pulsing the laser the second series and moving the one of the laser and the substrate, trepanning the laser to form the substantially oval shaped inlet.

BRIEF DESCRIPTION OF THE SEVERAL VIEWS OF THE DRAWINGS

Reference is now made briefly to the accompanying drawings, in which:

FIG. 1 is a cross-sectional view of an embodiment of a shaped cooling hole;

FIG. 2A is another sectional view of the shaped cooling hole of FIG. 1, taken along the line A-A';

FIG. 2B is another sectional view of the shaped cooling hole of FIG. 1, taken along the line B-B';

FIG. 3 is a sectional side view of a substrate coated with a thermal barrier coating and having an embodiment of the shaped cooling hole of FIGS. 1 and 2 formed therein as created by a process of drill then coat and clean;

FIG. 4 is another sectional view of the shaped cooling hole of FIG. 3, taken along the line A-A';

FIG. 5 is another sectional view of the shaped cooling hole of FIG. 3, taken along the line B-B';

FIG. 14 is a sectional side view of a substrate coated with a thermal barrier coating and having a conventional round cooling hole;

FIG. 15 is another sectional view of the conventional round cooling hole of FIG. 14, taken along the line A-A';

FIG. 16 is another sectional view of the conventional round cooling hole of FIG. 14, taken along the line B-B';

FIG. 17 is a sectional side view of a substrate coated with a thermal barrier coating and having a conventional conical film cooling hole;

FIG. 18 is another sectional view of the conventional conical film cooling hole of FIG. 17, taken along the line A-A';

FIG. 19 is another sectional view of the conventional conical film cooling hole of FIG. 17, taken along the line B-B';

FIG. 20 is a sectional side view of a substrate coated with a thermal barrier coating and having a conventional "3D" film cooling hole;

FIG. 21 is another sectional view of the conventional "3D" film cooling hole of FIG. 20, taken along the line A-A';

FIG. 22 is another sectional view of the conventional "3D" film cooling hole of FIG. 20, taken along the line B-B';

Like reference characters designate identical or corresponding components and units throughout the several views, which are not to scale unless otherwise indicated.

DETAILED DESCRIPTION OF THE INVENTION

Figure 6:
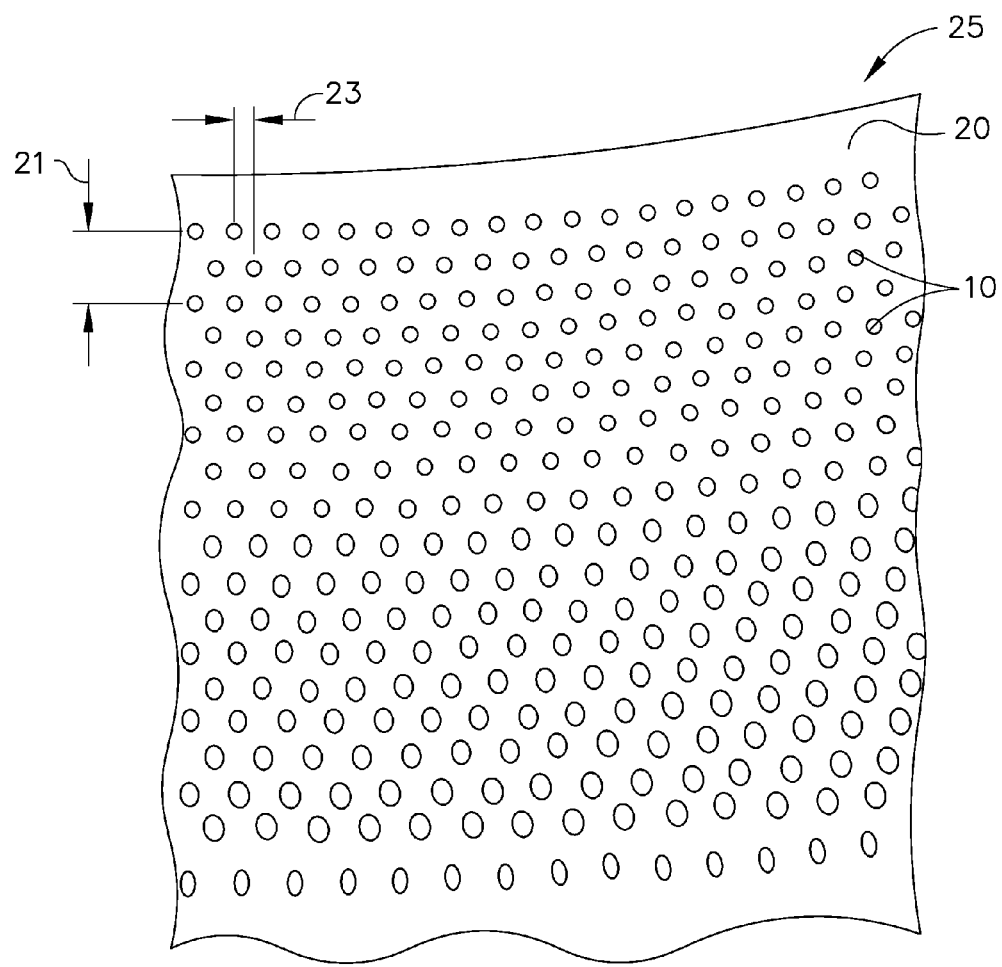
FIG. 6 is a diagram illustrating a portion of a substrate having an array of shaped cooling holes formed therein.

FIG. 1 is a sectional side view of a substrate 20 coated with one or more layers 27 and/or 28, and having an embodiment of the shaped cooling hole 10 formed at a predetermined angle therein as created by a process of coat and then drill. By way of example, and not limitation, a predetermined angle of the bore 53 relative to an exit surface 37 of the substrate 20 may range from about 20 degrees to 30 degrees. FIG. 2A is another sectional view of the shaped cooling hole of FIG. 1, taken along the line A-A'. FIG. 2B is another sectional view of the shaped cooling hole of FIG. 1, taken along the line B-B'. FIG. 3 is a sectional side view of a substrate coated with a thermal barrier coating and having an embodiment of the shaped cooling hole of FIGS. 1 and 2 formed therein as created by a process of drill then coat and clean. FIG. 4 is another sectional view of the shaped cooling hole of FIG. 3, taken along the line A-A'. FIG. 5 is another sectional view of the shaped cooling hole of FIG. 3, taken along the line B-B'.

Referring to FIGS. 1, 2A, 2B, 3, 4 and 5, the bore 53 of the shaped cooling hole 10 extends from an inlet 13 that is formed on a first side 36 of the substrate 20 to the outlet 11 of the shaped cooling hole 10 that is formed on a second side 37 of the substrate 20. As shown, the outlet 11 has larger dimensions than the inlet 13. The diameter 14 (FIGS. 2A, 2B, 4 and 5) of the bore 53 is cylindrical from the inlet 13 to a transition point 115 of the shaped cooling hole 10. From about the transition point 115 of the shaped cooling hole 10, the diameter 114 of the bore 53 expands in only in one dimension, e.g., in two directions along a single dimension, so that it has a first wing 31 and a second wing 33 (as shown in FIGS. 2A, 2B, 4 and 5), which are symmetrical about the shaped cooling hole's longitudinal center axis 35.

In FIGS. 1, 2A and 2B, there is no overflow within the bore 63 because the layers 27 and 28 are coated on the substrate 20 prior to the shaped cooling hole 10 being laser-drilled. The layer 27 is attached to an exit surface 37 of the substrate 20. Optionally, another layer 28, i.e., a second layer 28, is attached to the layer 27. In one embodiment, the layer 27 is a thermal barrier coating ("TBC"), and the layer 28, is either another thermal barrier coating or a bond coat. In another embodiment, the layer 27 is a non-thermal barrier coating and the layer 28 is a thermal barrier coating. Depending on the embodiment, one or more dimensions of the shaped cooling hole 10 can be scaled or modified to accommodate the thickness 30 of the substrate 20, an overall thickness 51 of the substrate 20 and the layer 27, or an overall thickness 52 of the substrate 20, the layer 27 and the layer 28.

Referring to FIGS. 2A and 4, the shaped cooling hole 10 has a bore 53 extending therethrough, from the inlet 13 to the outlet 11. The outlet 11 has a shaped portion that has opposing wings 31 and 33, which are symmetric about the center longitudinal axis 35 of the cooling hole 10 and that expand, or widen, in only one dimension. The cross-sectional views of FIG. 1 and FIG. 4 provide a basis for referring to embodiments of the shaped cooling hole 10 as having a "Y" shape.

FIG. 2B is another sectional view of the shaped cooling hole 10 of FIG. 2A, taken along the line B-B'. In other words, this is a cross-sectional view of the shaped cooling hole 10, looking from the outlet 11 (FIG. 2A) toward the inlet 13 (FIG. 2A). FIG. 5 is a cross-sectional view of the shaped cooling hole 10, looking from the outlet (FIG. 4) toward the inlet 13 (FIG. 4). Thus, the views of FIGS. 2B and 5 illustrates the shaped cooling hole 10 having shaped portions, or wings, 31 and 33, a cylindrical bore 53.

FIGS. 3, 4 and 5 depict a second embodiment of the shaped cooling hole 10 of FIG. 1. In this second embodiment, the shaped cooling hole 10 is first drilled in the substrate 20 at a predetermined angle. Afterwards, the substrate 20 is coated with at least a layer 27 of a desired material. As a result of this coating, some of the desired material that forms later 27 may overflow 29 within a portion of the outlet 11. Any overflow of a softer layer 28 is removed by blasting an abrasive through the bore 53.

FIG. 6 is a diagram illustrating a portion of a substrate 20 having an array 25 of shaped cooling holes 10 formed therein. In this particular, non-limiting example, the substrate 20 is a combustor liner of a gas turbine. The array 25 of shaped cooling holes 10 has a predetermined row spacing 21a and a predetermined hole spacing within rows 21b. Additionally, in one embodiment, adjacent rows of shaped cooling holes 10 are offset by a predetermined amount 23.

Figure 7:
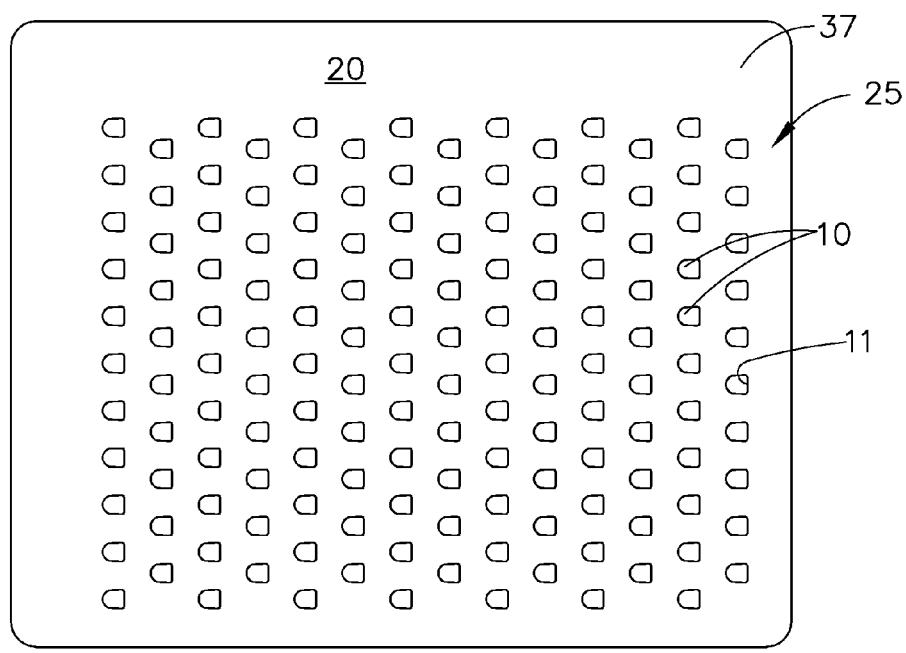
FIG. 7 is a top view of an exit surface of a substrate having an array of shaped cooling holes formed therein at a predetermined angle, illustrating the wide exit afforded each shaped cooling hole.
Figure 8:
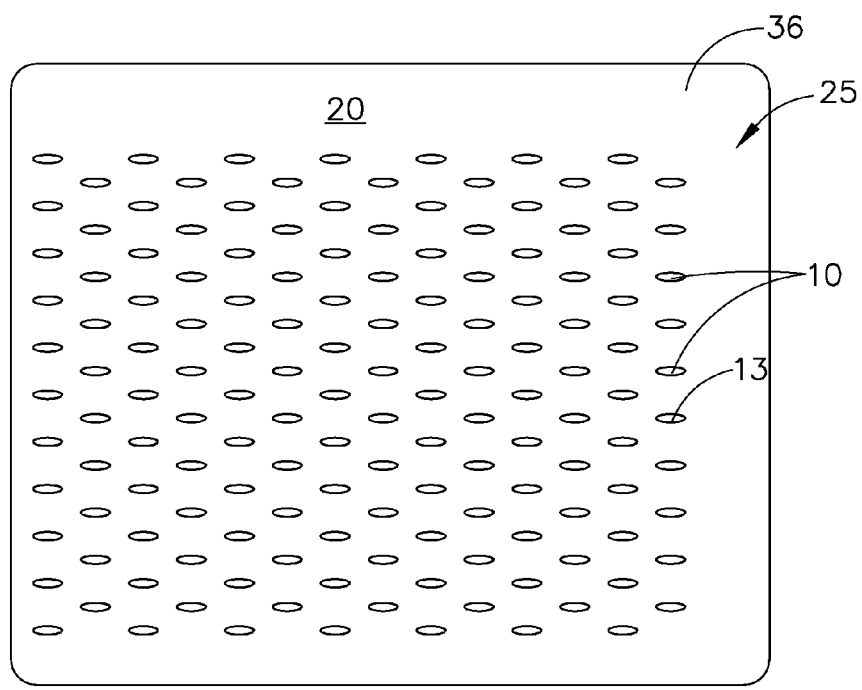
FIG. 8 is a top view of an opposite, inlet surface of the metal coupon of FIG. 7, illustrating the inlets of the shaped cooling holes.

FIG. 7 is a top view of an exit surface 37 of a substrate 20 having an array of shaped cooling holes 10 formed therein at a predetermined angle, illustrating the wide outlet 11 afforded by each shaped cooling hole 10. FIG. 8 is a top view of an opposite, inlet surface of the metal coupon of FIG. 7, illustrating the inlets 13 of the shaped cooling holes 10. In FIGS. 7 and 8, the substrate 20 is a metal coupon, which is optionally coated with one or more layers. Such layers may be the layers 27 and 28 described above with reference to FIG. 3.

Exemplary Benefits Associated with Embodiments of the Invention

As explained herein, embodiments of the shaped cooling holes 10 provide one or more exemplary and non-limiting benefits.

Referring again to FIGS. 1, 2 and 3, compared with the round and/or conical cooling holes formerly used, embodiments of the shaped cooling hole 10 expand the outlet 11 only in one dimension and stay generally cylindrical for about half their length, thereby maintaining high bore cooling velocity. However, although high bore cooling velocity is maintained through the bore 53, embodiments of the shaped cooling hole 10 tend to have reduced exit momentum of a coolant flow at the outlet 11, because the velocity of the coolant flow lessens upon entering the wider shaped portion of the shaped cooling hole 10. Accordingly, a coolant flowing through each shaped cooling hole 10 will have a first (entry) momentum through the inlet 13 and a reduced second (exit) momentum at the outlet 11. This reduced second momentum combines with the Coanda effect, which is the tendency of a fluid jet to be attracted to a nearby surface, to reduce undesirable blowoff. Consequently, embodiments of the shaped cooling hole 10 provide a uniform and wide thin film of coolant flow (hereinafter, "cool film"), which is larger than could be previously achieved with conventional round holes 120.

Thus, in one embodiment, a shaped cooling hole 10 has a cylindrical bore 53 that extends from the inlet 13 to the transition point 15 and has an outlet 11 that extends from the transition point 15 and expands only in one dimension, e.g., in at least one direction along one dimension, to minimize reduction of a layer 27 applied to an exit surface 37 of a substrate 20 and to spread out a cool film of cooling fluid that flows through the shaped cooling hole 10 so the cooling fluid can coalesce and reduce hot gaps between coolant tails. Accordingly, using embodiments of the shaped cooling hole 10 provides this expanded outlet 11, but without the harmful effects associated with other types of exit shapes of the conventional round cooling holes 120, the conventional conical film cooling holes 130, the conventional "3D" film cooling holes 140 or the conventional "fan" film cooling holes 150.

Moreover, it has been discovered that arrays of the shaped cooling holes 10 afford improved geometric coverage and reduced-blow off momentum. These effects combine to provide better establishment of a cool film on the exit surface of the substrate 20 than can be achieved with arrays of conventional types of film cooling holes 120, 130, 140 and 150. Additionally, while the improved cool film cooling fluid exiting from the outlet 11 of the shaped cooling hole 10 protects the exit surface 37 of the substrate 20 and/or its layer 27 and/or 28 (in FIG. 3), such as a thermal barrier coating ("TBC"), from excessive temperature better than round holes 120, the material(s) through which the bore 53 of the shaped cooling hole 10 is formed have convective heat transfer coefficients which help draw heat away from the exit surface 37 of the substrate 20 toward its inlet surface 36. By maintaining a higher average velocity along its length, the "Y" shaped hole 10 provides better convective cooling than conventional holes 130, 140, or 150. Also the shaped hole 10 can leave more thermal barrier 28 undisturbed than conventional holes 130 or 140. Thus, in an array of cooling holes, the shaped cooling holes 10 use fewer rows to establish a lower temperature thin film of cooling fluid at the outlet 11 than conventional cooling holes. The lower temperature thin film of cooling fluid at the outlet 11 of the shaped cooling hole 10 produces a cooler temperature on the exit surface 37 of the substrate 20, than can be presently obtained using conventional cooling holes. This affords increased part life at current cooling levels and/or allows thicker layer(s) 27, 28 within surface temperature limits.

In summary, it has been discovered that a substrate 20 having an array of the shaped cooling holes 10 described herein reduces the temperature of a layer, such as a thermal barrier coating and/or bond coat, previously applied to the substrate 20; and/or reduces the temperature of the underlying material that forms the substrate 20 as compared to the conventional types cooling holes 120, 130, 140 and 150. Either or both these benefits offer increased part life at current cooling levels and/or enables thicker layer(s), such as thermal barrier coating(s) and/or other types of coatings, within surface temperature limits. Benefits such as these are important, because customers for aircraft engines and other gas turbines desire fuel burn benefits of higher pressure ratio cycles, longer lives between overhauls, and reduced emissions. However, such conflicting requirements push for obtaining the greatest cooling benefit from the least amount of cooling flow. Also, there can be cost advantages to the shaped hole 10 compared to conventional holes 130, 140, or 150. The volume of material to be removed is less than for holes 130, 140, or 150. The ease of maintaining a desired flow characteristic is easier with a finite cylindrical portion than with holes 130 or 150. Finally, as described below, the shapes can be formed by rapid laser processes with simpler manipulations of laser focus, laser head motions, or part motions than holes 130 or 140. Since embodiments of the shaped cooling holes 10 described herein address these and/or other concerns, they are important enablers for optimum design of machines, such as, but not limited to engines and turbines, and/or components thereof.

Methods of Manufacture and/or Use

Various methods are used to manufacture the shaped cooling holes 10. One such method involves laser drilling a thru-hole and then initiating parallel shots, of differing depths, that march to two opposite sides of the thru-hole. Another such method includes rotating the substrate 20 (FIG. 1) and laser drilling on the fly with lead and lag. In either method, the substrate may be coated with one or more coatings before laser drilling or after.

Figure 9:
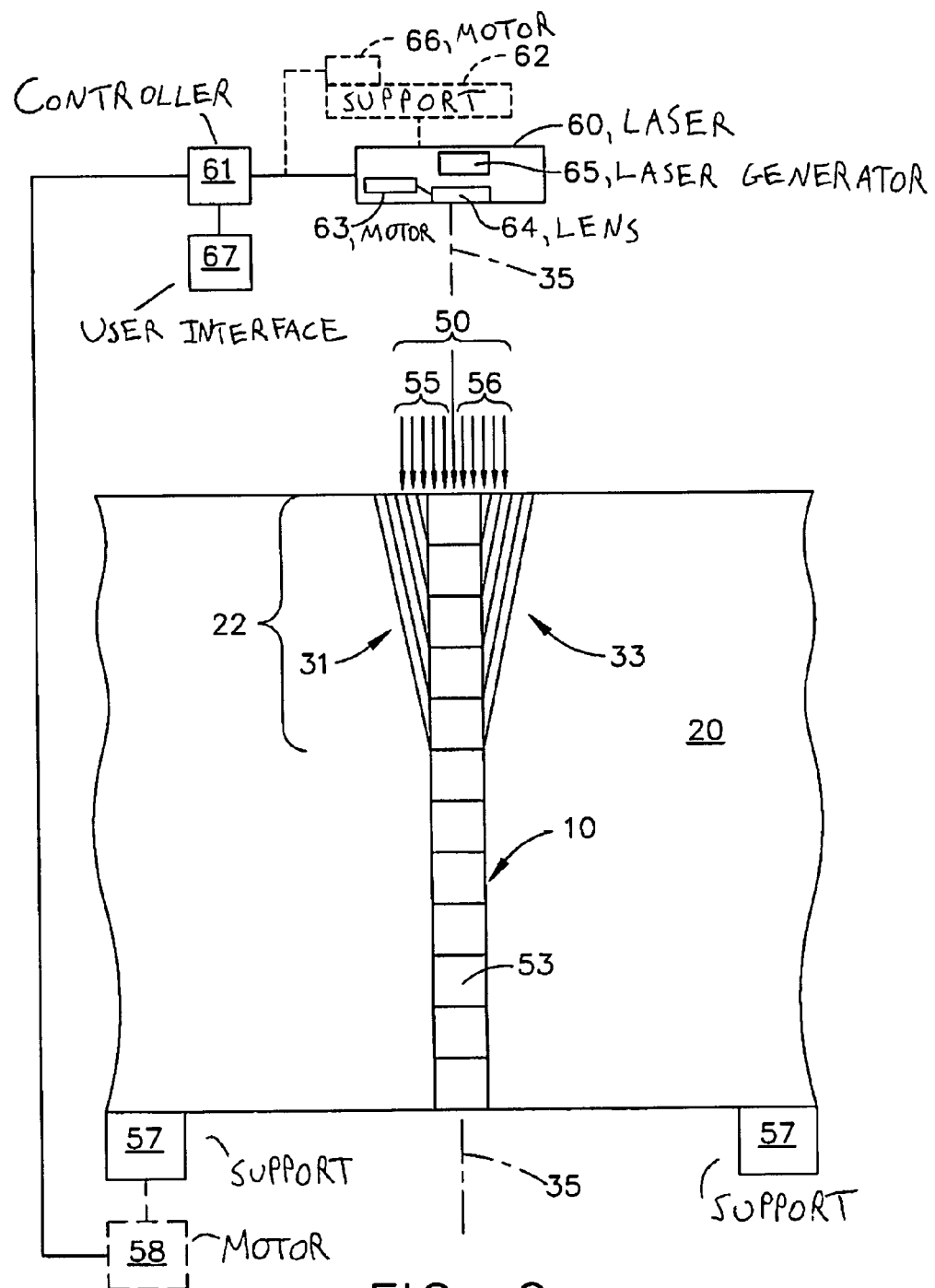
FIG. 9 is a diagram of an embodiment of the shaped cooling hole of FIGS. 1, 2, 3, 4, and 5, which diagram illustrates a method of manufacture.
Figure 10:
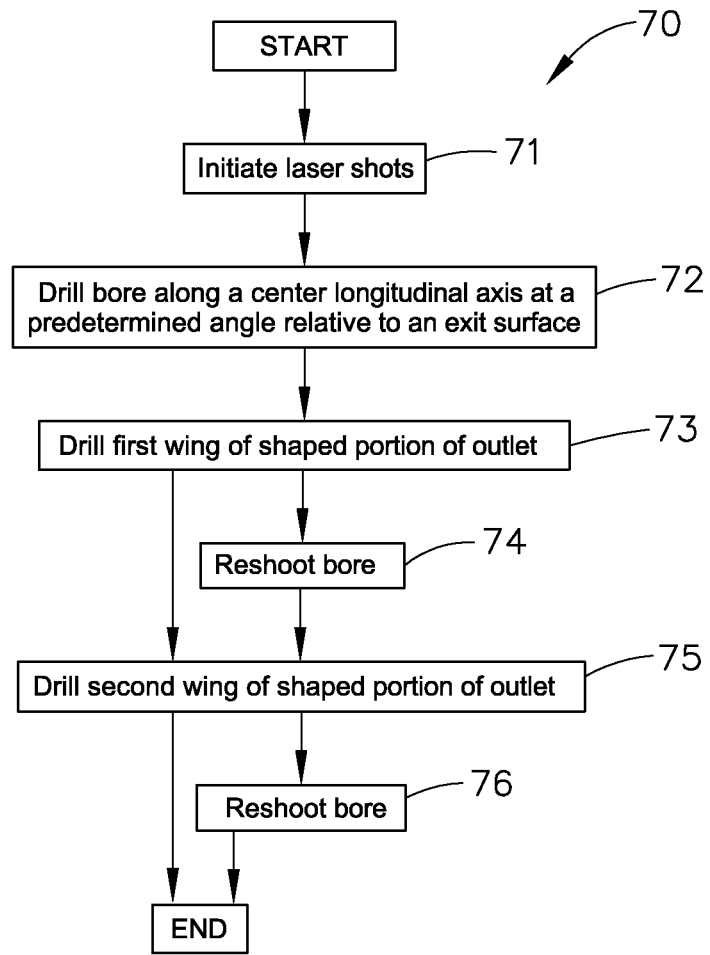
FIG. 10 is a flowchart further illustrating the method of manufacture of FIG. 9.

FIG. 9 is a diagram of an embodiment of the shaped cooling hole 10 of FIGS. 1, 2, 3, 4, and 5, which illustrates a method of manufacture. FIG. 10 is a flowchart further illustrating the method of manufacture of FIG. 9.

In FIG. 9, a shaped cooling hole 10 formed in a substrate 20 is shown. The substrate 20 is spaced apart from a laser source 60. The laser source 60 is coupled with a controller 61, which may be a general purpose or specific purpose computer. Optionally, the substrate 20 is supported on a fixed or moveable support 57. If the support 57 is moveable, it is coupled with a motor 58. In such an embodiment, the motor 58 can be coupled with the controller 61 to that the substrate 20 will be moved, in one or more dimensions relative to one or more laser beams 50 emitted by the laser source 60 and in accordance with one or more signals output from the controller 61 and received by the motor 58, to form the shaped cooling hole 10. The controller 61 may be coupled with a user interface 67. Non-limiting examples of the user-interface include a touch screen, a keyboard, a computer mouse, and the like.

In one embodiment, the laser source 60 comprises a laser generator 65, a lens 64, and a motor 63, which forms part of the laser source 60. In one embodiment, the motor 63 is coupled with the lens 64 and the controller 61 so that one or more laser beams 50 emitted from the laser source 60 will be moved and/or focused, in accordance with one or more signals output from the controller 61 and received by the motor 63, to form the shaped cooling hole 10.

Alternatively, the laser source 60 comprises the laser generator 65 and the lens 64; and the laser source 60 is optionally coupled with, or supported by, a support 62. In such an embodiment, the support 62 is coupled with and moved by a motor 66 that does not form part of the laser source 60, but which is coupled with the controller 61.

In either embodiment, the lens 64 comprises one or more lenses, and may comprise a lens assembly having a plurality of lenses, one or more of which may be moveable and coupled with one or more motors.

The controller 61 is configured to execute one or more computer readable instructions stored on a computer readable medium, such as any type of computer readable memory. The computer readable instructions configure the controller 61 to operate the laser source 60, and/or one or more of the motors 58, 63 and 66, to form the shaped cooling hole 10 in the substrate 20. Accordingly, in one embodiment, the computer readable instructions may configure the controller 61 to operate the laser source 60, and/or one or more of the motors 58, 63 and 66, to perform one or more of the method steps set forth in FIG. 10.

Referring to FIGS. 9 and 10, the method 70 comprises one or more of the following steps 71, 72, 73, 74, 75, and 76, which unless otherwise indicated may be performed in any suitable order and/or combination. Illustratively, an embodiment of the method 70 starts by initiating 71 a predetermined sequence and/or pattern of laser shots 50 that impinge a substrate 20, such as a combustor liner for a gas turbine. In one embodiment, the laser shots 50 are parallel to each other. This predetermined sequence of laser shots 50 may comprise drilling 72 a bore 53 along a center longitudinal axis 35 of the shaped cooling hole 10, and then performing one or more sequences of steps 73, 74, 75 and 76. The bore 53 is drilled from either the inlet surface or the exit surface of the substrate 20 (FIG. 1).

For example, after drilling 72 the bore 53, the method 70 further comprises drilling 73 a first wing 31 of the shaped portion of the outlet 11 (FIG. 1) of the shaped cooling hole 10 by applying a first sequence of laser shots 55 to the substrate 20 adjacent one side of the bore 53. This first sequence of laser shots 55 begins at or proximate the center longitudinal axis 35, or bore 53, and marches outwards away from the center longitudinal axis 35. Each laser shot in the first sequence of laser shots 55 is drilled less than a beam diameter from its predecessor such that the overlapping portions of the shots penetrate more close to the bore than at the end of the wing. Additionally or alternatively, each laser shot in the first sequence of laser shots 55 is angled relative to the center longitudinal axis 35. As described above, the timing, depth, focal point, width, angle, and/or pattern of the first sequence of laser shots 55 are controlled and determined by computer readable instructions that are read and executed by the controller 61 and/or converted to signals that are output to the laser source 60 and/or one or more of the motors 58, 63 and 66. After drilling 73 the first wing 31 of the shaped cooling hole 10, the method 70 optionally comprises reshooting 74 the bore 53. Otherwise, the method 70 further comprises drilling 75 a second wing 33 of the shaped portion of the shaped cooling hole 10 by applying a second sequence of laser shots 56 to the substrate 20 adjacent a second side of the bore 53, wherein the second side of the bore 53 is opposite the first side of the bore 53. This second sequence of laser shots 56 begins at or proximate the center longitudinal axis 35, or bore 53, and marches outwards away from the center longitudinal axis 35, and in a direction opposite the first wing 31. Each laser shot in the second sequence of laser shots 56 is drilled less than a beam diameter from its predecessor such that the overlapping portions of the shots penetrate more close to the bore than at the end of the wing. Additionally or alternatively, each laser shot in the second sequence of laser shots is angled relative to the center longitudinal axis 35. As described above, the timing, depth, focal point, width, angle, and/or pattern of the second sequence of laser shots 56 are controlled and determined by computer readable instructions that are read and executed by the controller 61 and/or converted to signals that are output to the laser source 60 and/or one or more of the motors 58, 63 and 66. After drilling 76 the second wing 33 of the shaped cooling hole 10, the method 70 may optionally comprise reshooting 76 the bore 53 to clean out any material deposited during the drilling of the wings. In one embodiment, the first sequence of laser shots 55 and the second sequence of laser shots 56 are configured to drill the wings 31 and 33, respectively, from the exit surface of the substrate 20 (FIG. 1). Thereafter, the method 70 may end and the laser or the substrate 20 can be moved by motors 66 or 58 to align with the next hole in the pattern, with method 70 repeated until all holes desired in the substrate 20 have been drilled.

Figure 11:
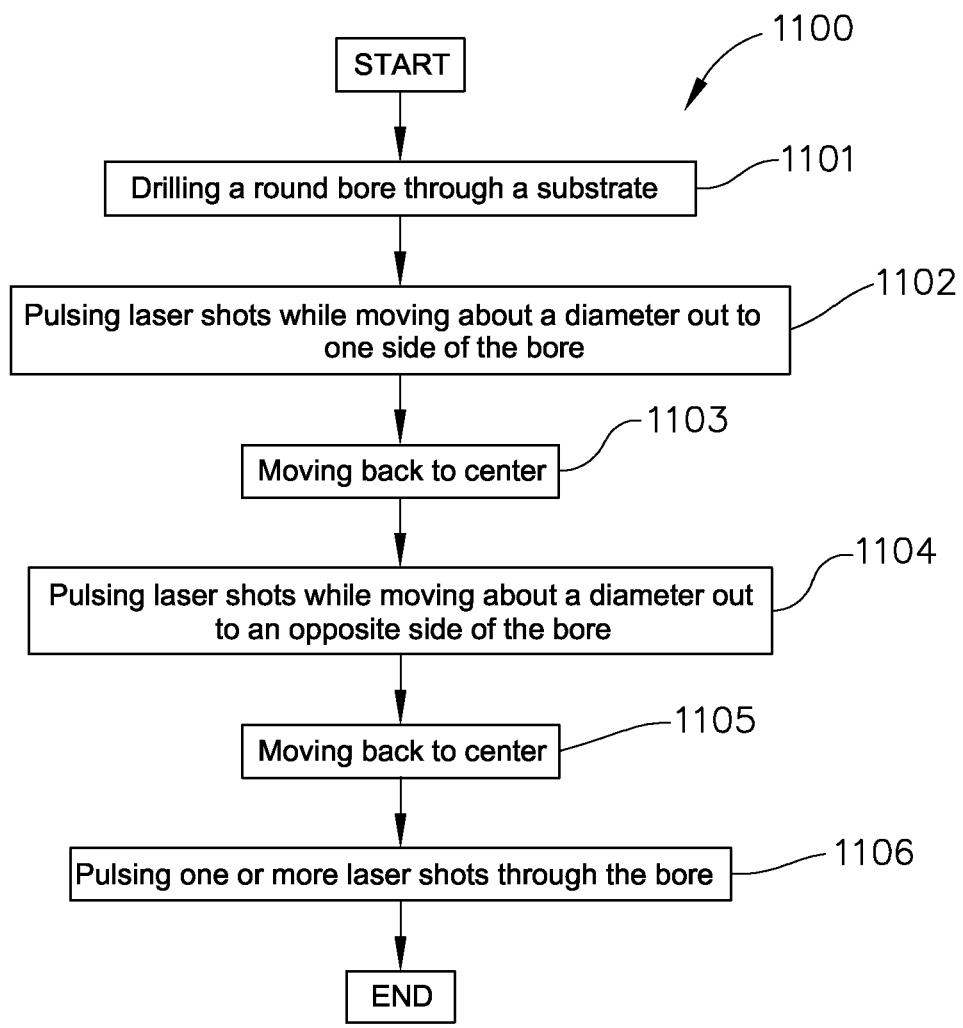
FIG. 11 is a flowchart of an embodiment of another method for making one or more shaped cooling holes, such as the shaped cooling hole shown in FIGS. 1, 2, 3, 4, 5 and 9.

FIG. 11 is a flowchart of an embodiment of another method 1100 for making one or more shaped cooling holes, such as the shaped cooling hole 10 shown in FIGS. 1, 2A, 2B, 3, 4, 5 and 9. With reference to these Figures, the method 1100 begins by percussive laser drilling 1101 of a bore 53 of a round through hole. The method 1100 further comprises pulsing 1102 laser shots while moving about one diameter out to one side, or wing 31, of the bore 53. The method further comprises stopping 1103 the laser shot pulsing while moving back to center. The method further comprises pulsing 1104 laser shots while moving about one diameter out to an opposite side, or wing 33, of the bore 53. The method 1100 further comprises stopping 1105 the laser shot pulsing while moving back to center. The method 1100 further comprises shooting 1106 one or more laser shots to clean up the bore 53.

Depending on the embodiment, it may require about twice as many laser shots to form each shaped cooling hole 10, as it does to form a conventional round cooling hole. Additionally, it has been determined that the wings 31 and 33 (FIG. 9) can be formed by pulsing the laser shots 50 (FIG. 9) while swinging them through a predetermined angle relative to a surface (e.g., exit surface 37 in FIG. 2) of the substrate 20. However, this approach requires detailed tracking of the laser shots and the surface location of each shaped cooling hole 10. Additionally, the laser drilling used in at least one embodiment to make the shaped cooling holes 10 can be performed through TBC coated substrates or bare metal.

Figure 12:
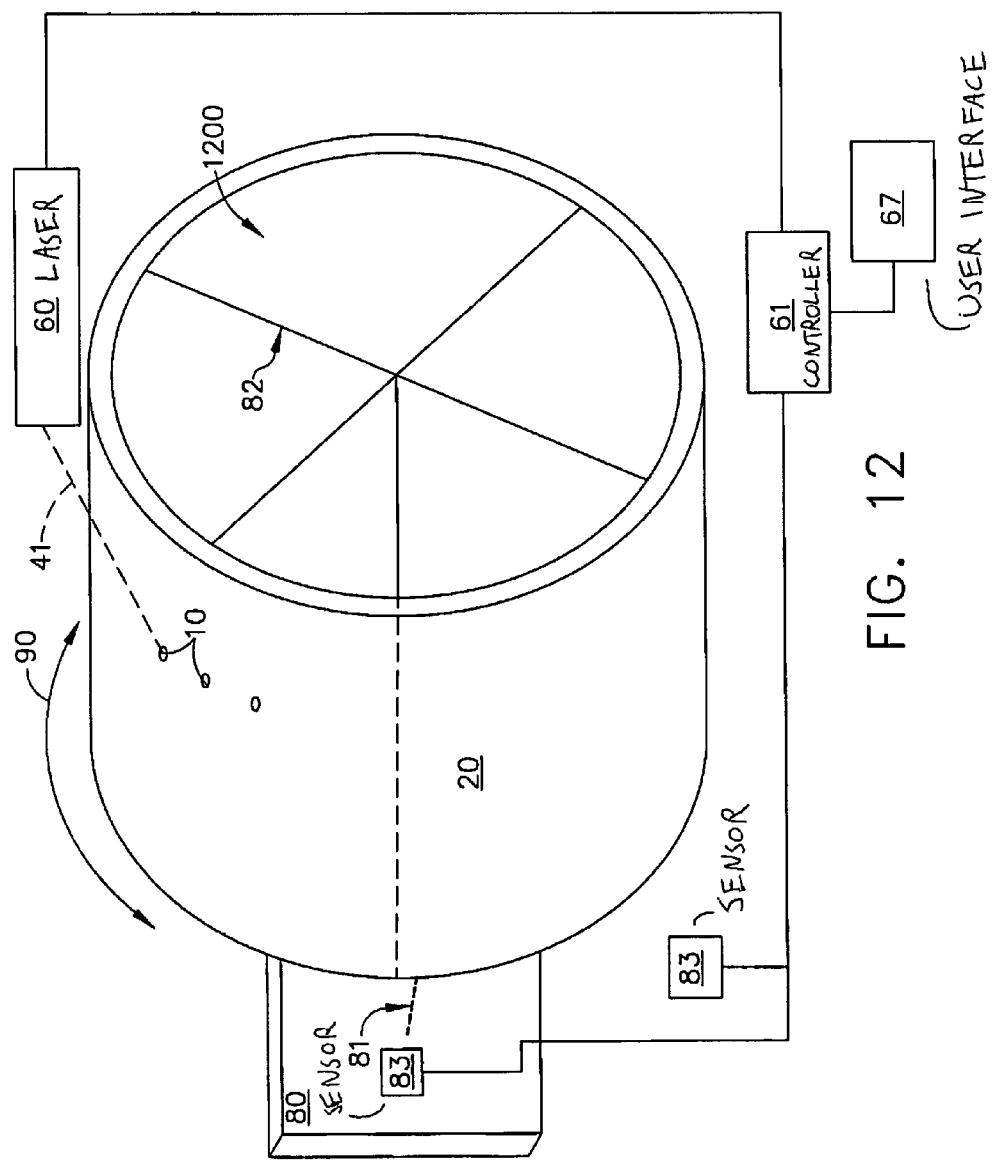
FIG. 12 is a diagram of an embodiment of a system used to manufacture one or more shaped cooling holes.

FIG. 12 is a diagram of an embodiment of a system 1200 used to manufacture one or more shaped cooling holes 10. The system 1200 includes a laser source 60 that is spaced apart from a brace 82, which is configured to hold and/or support a substrate 20, such as a combustor liner of a gas turbine, in a manner that allows the substrate 20 to rotate clockwise or counterclockwise, as indicated by arrows 90, when a shaft 81 that is coupled with the brace 82 is turned by a motor 80. The laser source 60 may comprise the motor 63, lens 64 and laser generator 65 (shown in FIG. 9). A controller 61 is coupled with the motor 80, which rotates the substrate 20. The controller 61 is also coupled with the laser source 60, which generates one or more laser shots 91. In one embodiment, the controller 61 is also coupled with one or more sensors 83 and/or the user interface 67. The one or more sensors 83 provide data about one or more components of the system 1200 to the controller 61. For example, the one or more sensors 83 may be rotational sensors that measure the rotations per minute of the shaft 81 and/or of the substrate 20. The one or more sensors 83 may also include sensors that measure the spacing and/or depth of the one or more shaped cooling holes 10, as the one or more shaped cooling holes 10 are drilled by the one or more laser shots 91.

The controller 61 is configured to read and execute one or more computer readable instructions stored in or on a computer readable medium, such as any type of computer readable memory. The computer readable instructions configure the controller 61 to operate the laser source 60 and the motor 80 to form the one or more shaped cooling holes 10 in the substrate 20. Accordingly, in one embodiment, the computer readable instructions configures the controller 61 to synchronize operation of the laser source 60 and the motor 80 so that one or more of the method steps set forth in FIG. 12 are performed. For example, the commands outputted by the controller 61 can synchronize speed of the motor 80, and/or a frequency of rotation of the substrate 20, with the timing, duration and/or power of the one or more laser shots 91 that are generated by the laser source 60 so that one or more shaped cooling holes 10 are formed in and/or through the substrate 20.

Figure 13:
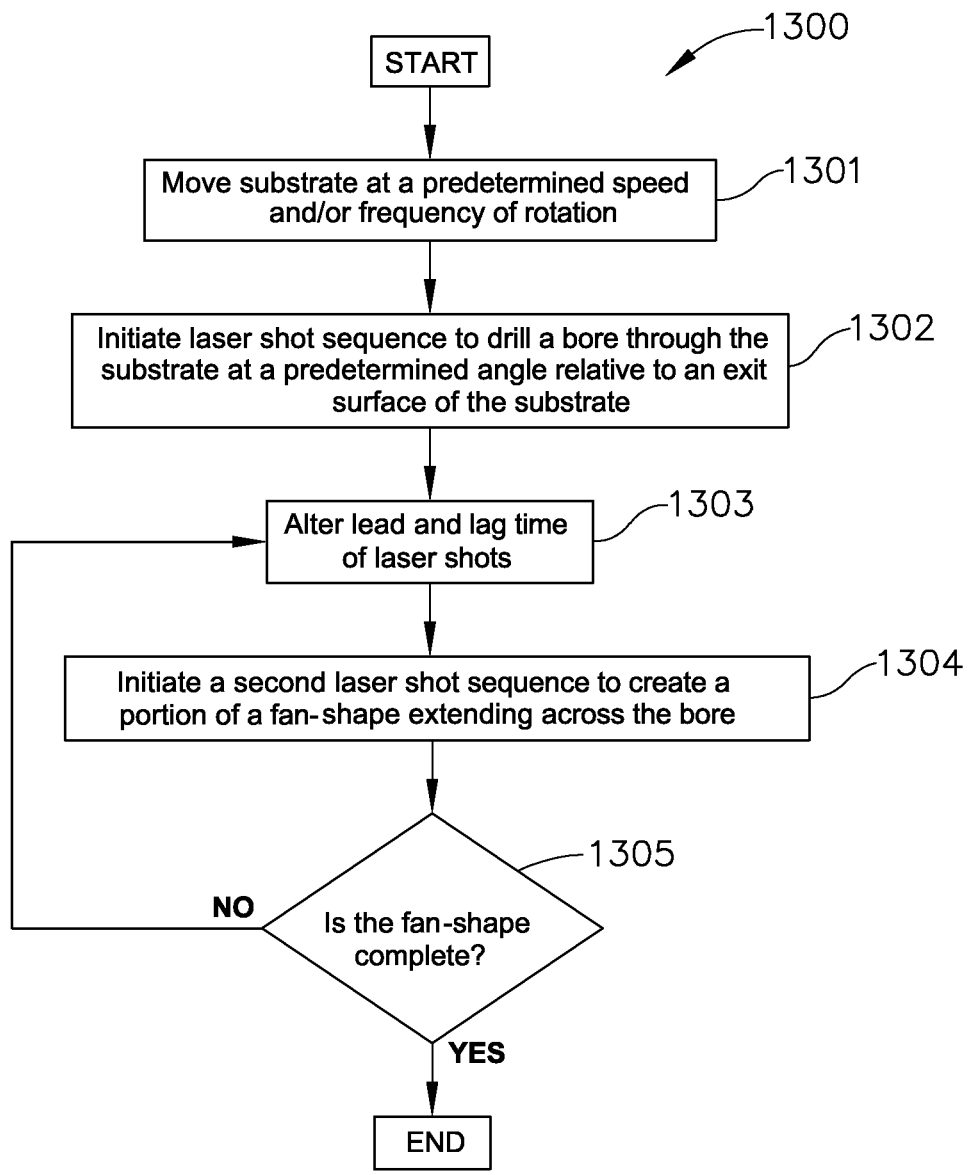
FIG. 13 is a flowchart further illustrating a method of manufacturing one or more shaped cooling holes in a substrate, such as that shown in FIG. 12.
Figure 23:
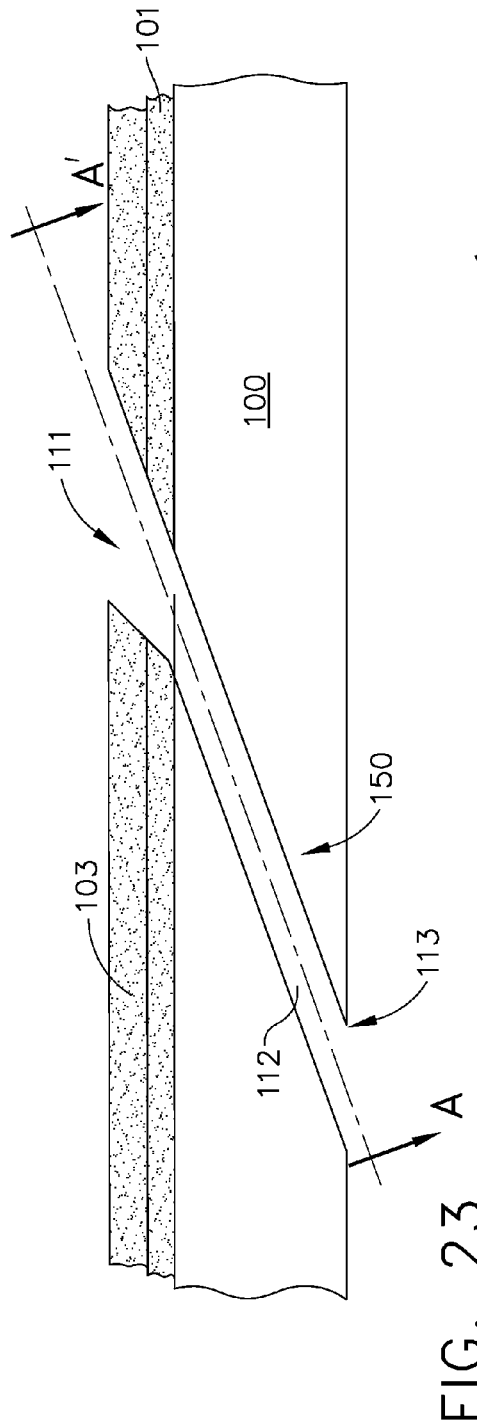
FIG. 23 is a sectional side view of a substrate coated with a thermal barrier coating and having a conventional "fan" film cooling hole.
Figure 24:
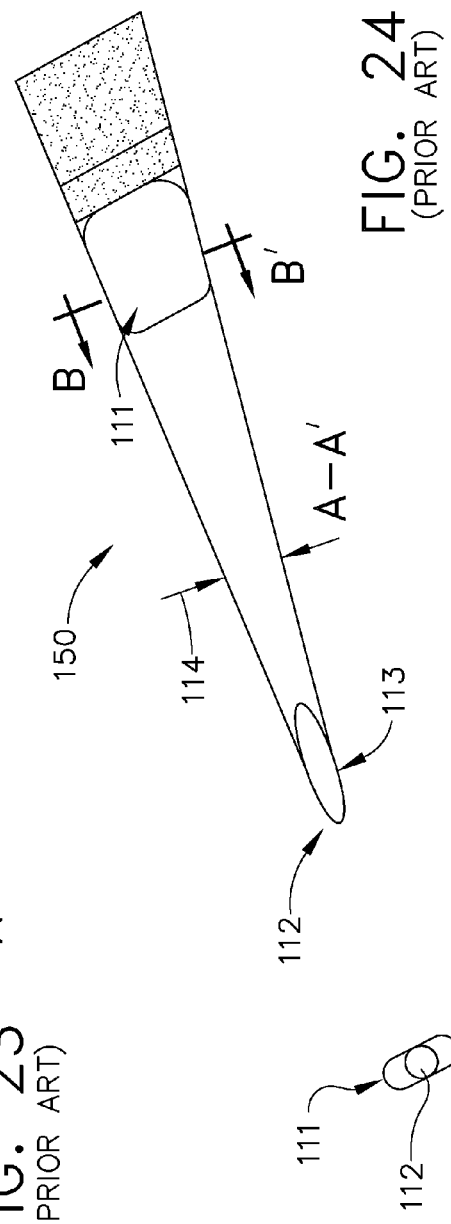
FIG. 24 is another sectional view of the conventional "fan" film cooling hole of FIG. 23, taken along the line A-A'.
Figure 25:
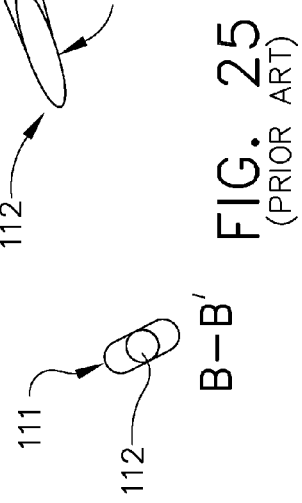
FIG. 25 is another sectional view of the conventional "fan" film cooling hole of FIG. 23, taken along the line B-B'.

FIG. 13 is a flowchart further illustrating a method 1300 of manufacturing one or more shaped cooling holes in a substrate 20, such as that shown in FIG. 12. Referring to FIGS. 12 and 13, the method 1300 begins by moving, or rotating, 1301 the substrate 20 at a predetermined speed, or frequency of rotation. The method 1300 further comprises initiating 1302 a first sequence of laser shots 91 to drill one or more bores 53 (FIG. 9) in the substrate 20, each at a predetermined angle. The method 1300 further comprises adjusting 1303 the timing of a second sequence of laser shots 91 to lead or lag the passing of same location(s) on the substrate 20 of first sequence of laser shots 91 by a predetermined increment of time. The timing is specified in relation to the rotational speed to cause partially overlapping laser shots 91 to create portions of fan shapes, each of which extends across a respective one of the one or more bores 53 (FIG. 9). Thus, the method 1300 further comprises initiating 1304 the second sequence of laser shots 91 with varying degrees of lead and lag timing, specified in relation to the rotational speed, to cause partially overlapping laser shots 91 to create portions of fan shapes, e.g., wings 31 and 33, in one dimension tangential to a direction of rotation, each of which extends across a respective one of the one or more bores 53. The controller 61 then determines 1305 whether the fan-shape is complete. If not, the method 1300 loops back and repeats steps 1303 and 1304. The method 1300 ends when the outlets 11 of each of the one or more shaped cooling holes 10 are complete and expanded only plus and/or minus in the direction of rotation.

The substrate 20 can be coated with a TBC before or after the method 70 of FIG. 10, or the method 1100 of FIG. 11, or the method 1300 of FIG. 13 is performed. Coating the substrate with a TBC prior to laser drilling ensures the TBC does not fill and/or block the shaped cooling holes. If the TBC is applied after laser drilling, the shaped cooling holes will need to be further treated with grit and/or laser shots to remove any coating that has entered them. Alternatively, the substrate 20 can be simultaneously coated with a TBC and cleaned to ensure that the TBC does not occlude the shaped cooling holes. In such an embodiment, one side of the rotating substrate 20 (of FIG. 11) receives a TBC while the other side has grit blasted through the shaped cooling holes to keep them open. Experiments have shown that such a process is capable of keeping the "wings" of the shaped cooling holes clear, or substantially clear, of TBC.

EXPERIMENT

Wind tunnel testing of embodiments of the shaped cooling holes 10 described herein have validated one or more benefits associated with embodiments of the shaped cooling holes, such as cooler thermal barrier coating ("TBC") temperatures and cooler backside temperatures than those achieved using conventional types of cooling holes 120, 130, 140 and 150.

During testing, hot air at about 600° F. and cool air at about 80° F. were flowed onto and/or around a test substrate and a control substrate. The control substrate had a plurality of conventional round cooling holes 120 formed therein. One surface of the control substrate, e.g., the front side, was coated with a TBC. The opposite surface of the control substrate, e.g., the backside, was uncoated.

The test substrate had a plurality of shaped cooling holes 10 (FIGS. 1, 2, 3, 4, 5 and 9) formed therein. One surface of the test substrate, e.g., the front side, was coated with a TBC. The opposite surface of the test substrate, e.g., the backside, was uncoated.

To measure the TBC temperatures under simulated take-off conditions, infrared images of the TBC side of the control substrate and of the TBC side of the test substrate were taken during the testing. The backside temperatures of both the test substrate and the control substrate were measured using thermocouples. The temperature data from the infrared images and thermocouples was analyzed, and it was determined that significantly lower TBC temperatures and backside temperatures resulted from using embodiments of the shaped cooling holes 10 described herein.

Testing further demonstrated that these cooling benefits were robust to varying operating conditions, manufacturing techniques and part-to-part variation. For example, one test showed that backside temperatures of a test substrate in which embodiments of the shaped cooling holes 10 were drilled averaged about 50° F. (10° C.) cooler than the backside temperatures of a control substrate in which round cooling holes 120 were drilled.

Figure 26:
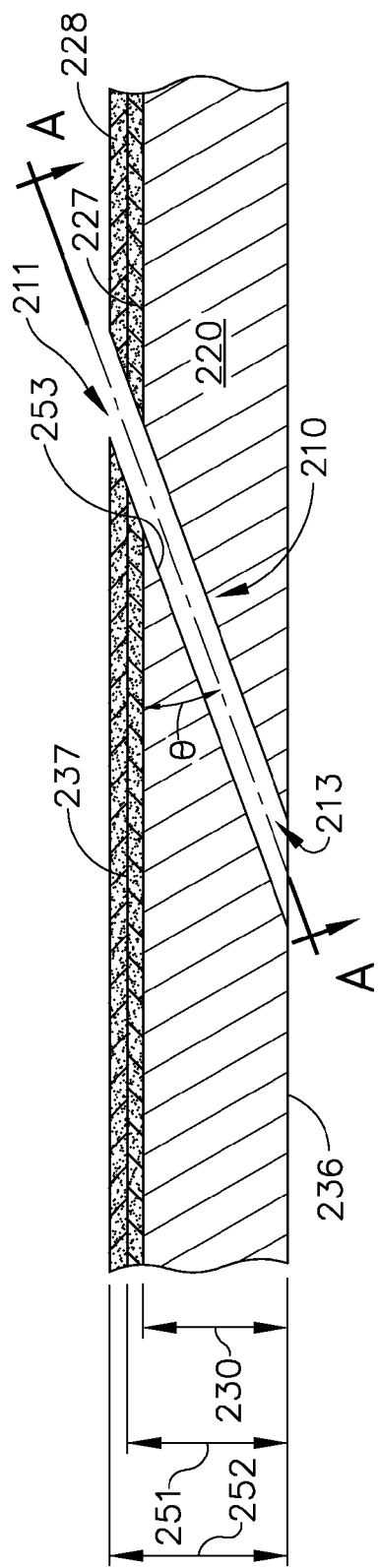
FIG. 26 is a cross-sectional view of an alternate embodiment of a shaped cooling hole.

Referring now to FIG. 26, a sectional side view of a substrate 220 coated with one or more layers 227, 228, includes a shaped cooling hole or slot 210 formed at a pre-selected angle through the substrate 220. The depicted alternative embodiment may be created as previously described by a process of coat and drill. However, as previously described, the instant embodiment may also be utilized by forming the shaped cooling hole first at the pre-selected angle then subsequently coating the substrate with at least one layer 227. As a further alternative, the coating of at least one layer 227 may be optional as well. By way of non-limiting example, a pre-determined angle theta θ is depicted for the bore 253 of the cooling hole 210 relative to an exit surface 237. The substrate 220 includes an inlet surface 236 and the exit surface 237. Cooling air flows from the inlet surface side of the substrate 220 through the cooling hole 210 toward the exit surface side 237. The pre-selected angle may range from about 5 degrees up to about 50 degrees relative to the exit surface 237. According to some embodiments, the pre-selected angle theta is about 20 degrees.

The substrate 220 may be, according to one embodiment, a combustor liner. The depicted embodiments improve performance of cooling film moving along the exit surface 237 or along the one or more layers 227, for example thermal barrier coatings ("TBC"). The improvements provide better cooling performance along the exit side of the substrate and at least one coating 227 by widening of the inlet 213, as compared to previous embodiments, to produce a higher flowing slot or cooling hole 210. The shaped cooling hole 210 provides higher level of flow per unit area and may be utilized in, for example, combustor liners where accumulated cooling film is stripped away by combustor aerodynamics.

The cooling hole 210 extends from an inlet 213 formed in the first or inlet side 236 of the substrate 220. The cooling hole extends through the substrate 220 toward an outlet 211 formed in the second or exit side 237. As described further herein, the inlet 213 has a first area dimension of the inlet opening and the outlet 211 has a second area dimension wherein the first inlet area is less than the second outlet area.

The at least one layer 227 is depicted on the exit substrate 237 and is defined by a thermal barrier coating. The substrate 220 may further include a second layer 228 disposed over the at least one layer 227. The second layer 228 may be another thermal barrier coating or alternatively may be a bond coat. According to some other alternate embodiments, the layer 227 is a non-thermal barrier coating and the second layer 228 is a thermal barrier coating. Each of the layers 227, 228 has a corresponding thickness 251, 252. These thicknesses 251, 252 are represented as measured from the inlet surface 236 but may be determined by subtracting the depicted substrate thickness 230. Additionally, as noted the depicted layers 227, 228 may be optional.

Figures 27, 28:
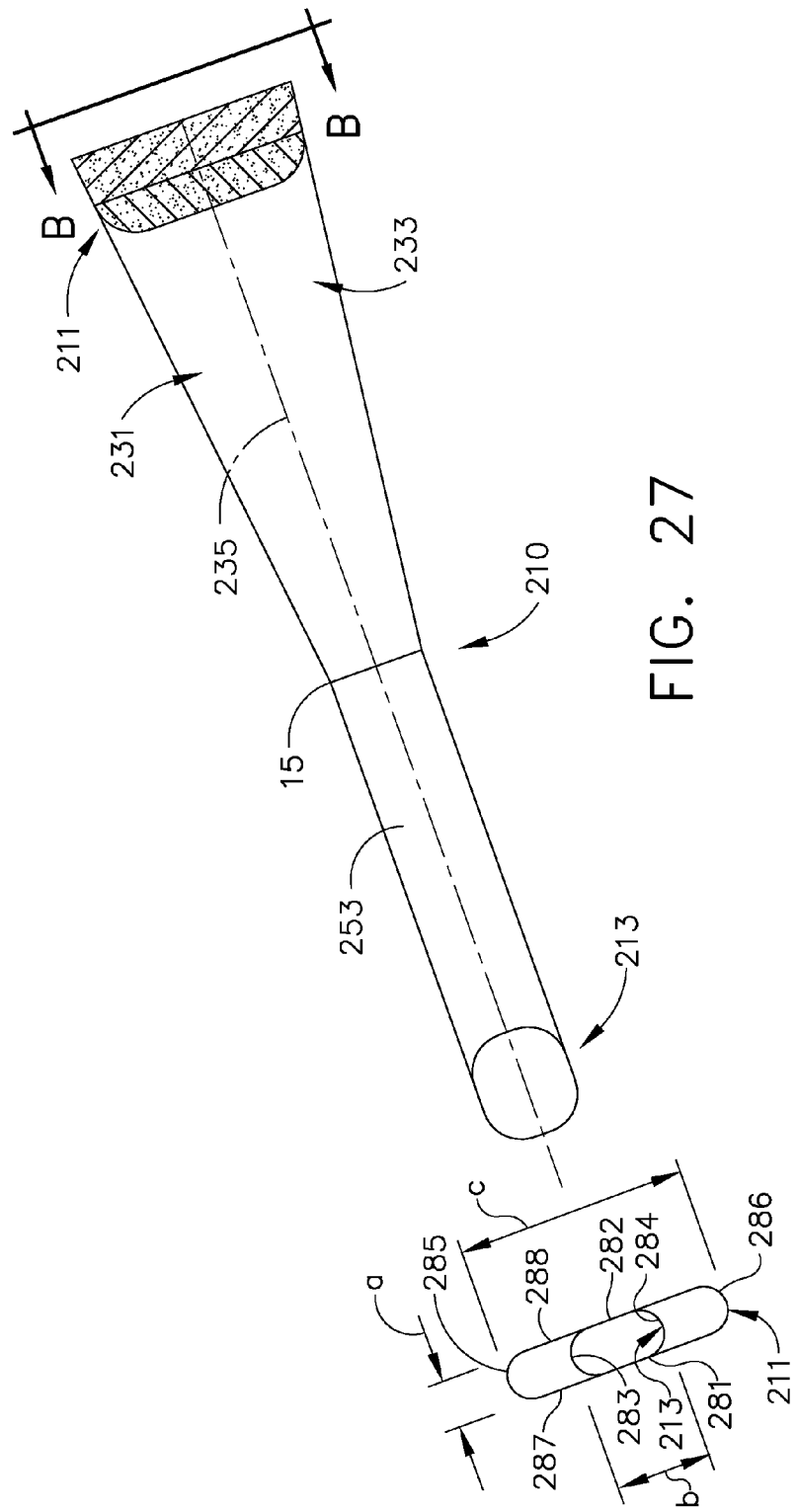
FIG. 27 is another sectional view of the shaped cooling hole of FIG. 26, taken along line A-A.
FIG. 28 is another sectional view of the shaped cooling hole of FIG. 26, taken along line B-B.

Referring now to FIG. 27, a section view taken along line A-A (FIG. 26) is depicted. The inlet end 213 is in flow communication with the bore 253 which is generally shaped to match the cross-section of the inlet 213. For example, in the instant embodiment, the bore is substantially oval shaped. The bore 253 extends from the inlet to a transition point 215 of the shaped cooling hole 210. From the transition point 215, the shape of the bore 253 expands generally in one dimension, that is two directions along a single dimension so that the cooling hole 210 expands to form a first wing 231 and a second wing 233. These wings 231, 233 may be symmetrical about the center axis 235 of the cooling hole 210 or alternatively they may not be symmetrical. In symmetrical applications, the wings 231, 233 may expand equally in the two directions of a single dimension. In non-symmetrical applications, the wings may expand solely in one direction or in one direction more than the second opposite direction. As better seen in this view, the inlet 213 is a first area and a second area at the outlet 211 which is partially depicted. The first area of the inlet 213 is less than the second area of the outlet 211.

Referring now to FIG. 28, an end view of the cooling hole 210 is depicted along line B-B (FIG. 27). The view depicts clearly the comparison of areas at the inlet 213 and the outlet 211. The view depicts two generally oval shaped openings wherein the smaller opening corresponds to the inlet 213 and the larger opening corresponds to the outlet 211. Referring first to the inlet 213, the opening is defined by a first linear segment 281 and an opposite second linear segment 282. Each of these linear segments is parallel having first and second ends, each of these ends is connected to ends of opposed curvilinear segments 283, 284. Each of the curvilinear segments 283, 284 is connected at ends to the ends of the linear segments 281, 282.

The outlet 211 includes a first curvilinear segment 285 and a second opposite curvilinear segment 286. Each of the segments 285, 286 has first and second ends. The segments 285, 286 are connected at end by first and second linear segments 287, 288. As shown in the line of sight depicted in FIG. 28, both of the inlet and outlet apertures are generally oval in shape. The area of the inlet 213 is at a smaller dimension than the area of the outlet 211. Additionally, the outlet aperture 211 expands in a single dimension along two directions to provide the larger dimension of the outlet aperture 211. Otherwise stated, the linear segments 287, 288 expand in a single dimension, two directions defining the wings 231, 233.

Figure 29:
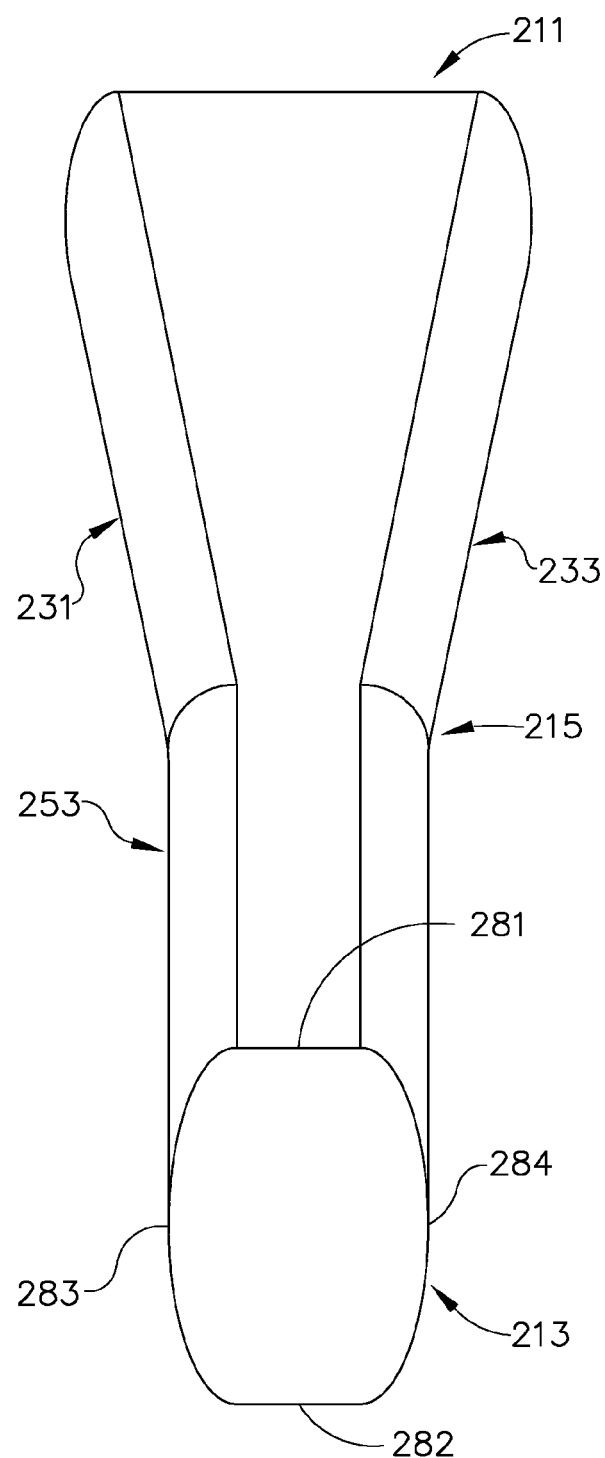
FIG. 29 is an elevation view of an exemplary shaped cooling of FIG. 26.

Referring now to FIG. 29, the inlet 213 is shown. Additionally, the first and second linear segments 281, 282 are shown as well as the first and second curvilinear segments 283, 284. The cooling aperture 210 is further shown with the bore 253 extending from the inlet 213 toward the transition 215. Opposite the inlet 213 is the outlet 211. While the inlet 213 appears to be some shape other than generally oval shaped, as previously described, such shape is merely due to the angle on which the inlet 213 passes through the inlet surface 236.

Figure 30:
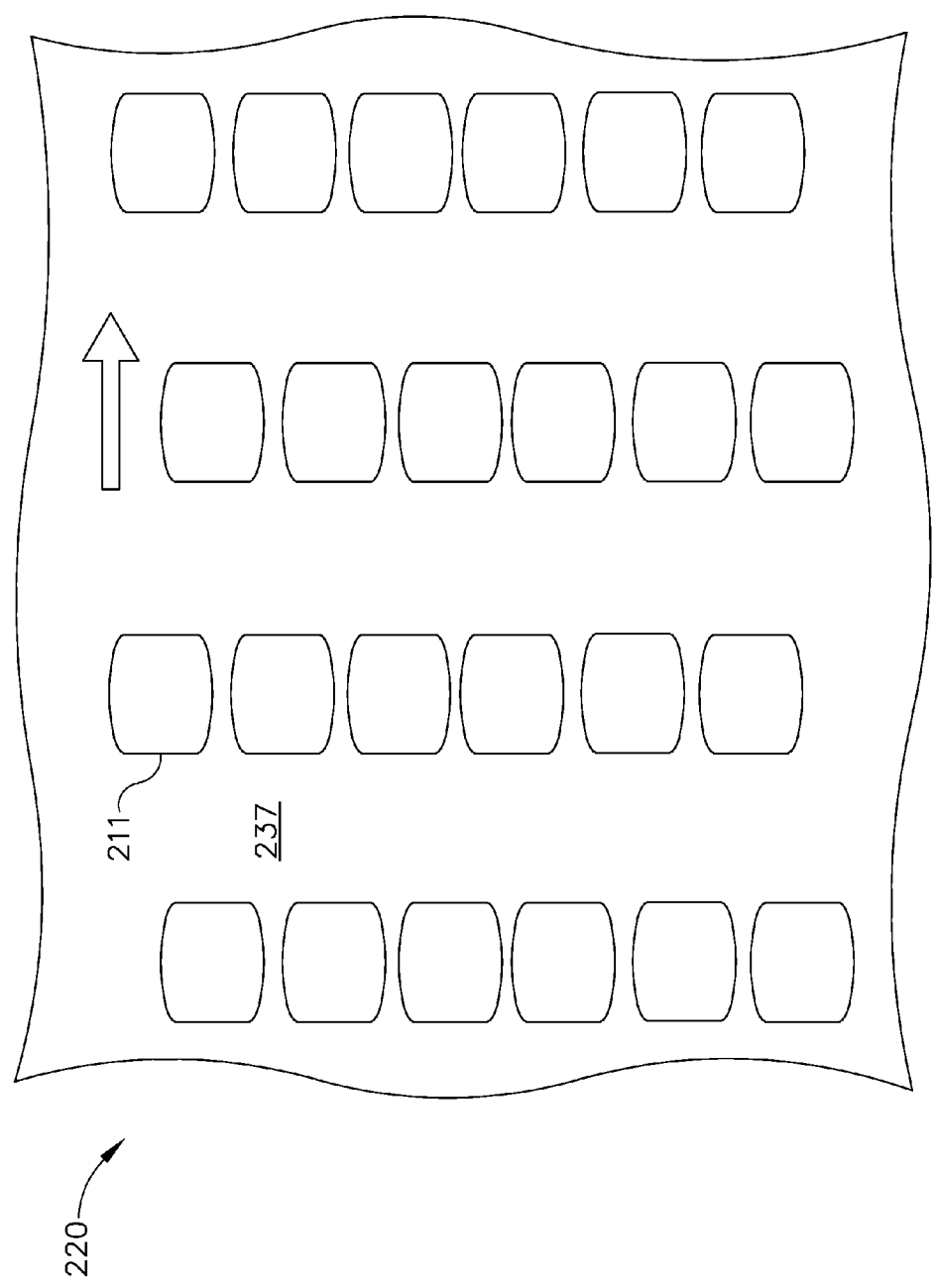
FIG. 30 is a top view of an exit surface of a substrate.

Referring now to FIG. 30, a top view of an exit surface 237 is depicted. The exit surface 237 of the substrate 220 has a plurality of exit apertures 211 which establish the thermal barrier or cooling film along the surface 237 of substrate 220. Each exit aperture 211 extends into the substrate 220 at a preselected angle and is disposed with a predetermined hole spacing. The number of holes 211 may be may be arranged to provide the additional cooling of the instant embodiment as opposed to the value of the smaller holes of the previous embodiments where additional cooling is desired. Testing indicates that regions of the substantially oval shaped apertures 211 may provide cooling of the substrate 237 at about 200° Fahrenheit.

Figure 31:
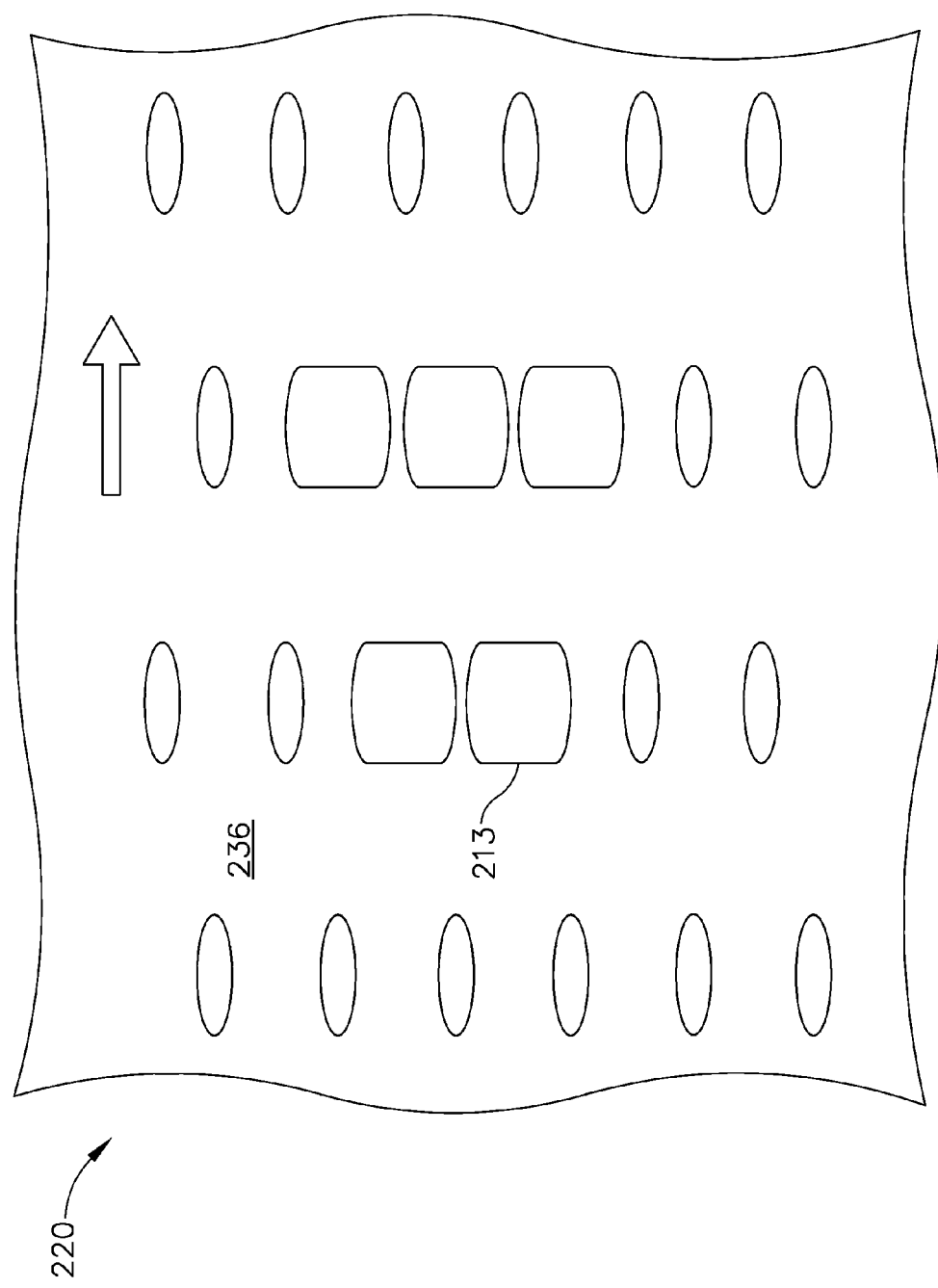
FIG. 31 is a top view of an inlet surface of a substrate.

Referring to FIG. 31, a top view of an opposite inlet surface 236 is depicted. The inlet surface utilizes a number of small inlet apertures and larger inlet apertures 213 which correspond to the areas where additional cooling may be needed at the exit surface 237. A directional air flow arrow is shown indicating the direction of air flow along the substrate 220 which enters the inlet aperture 213 and passes through the cooling holes 210 to the exits 211 (FIG. 30). The arrays of cooling holes 210 depicted in FIGS. 30, 31 may have spacing of preselected distance in both dimensions of the depicted figures. While various size inlets are shown, one skilled in the art should understand that the corresponding outlets 211 (FIG. 30) may be all of the same size as depicted or may be differing size as allowed by the substrate surface dimensional constraints.

Figure 32:
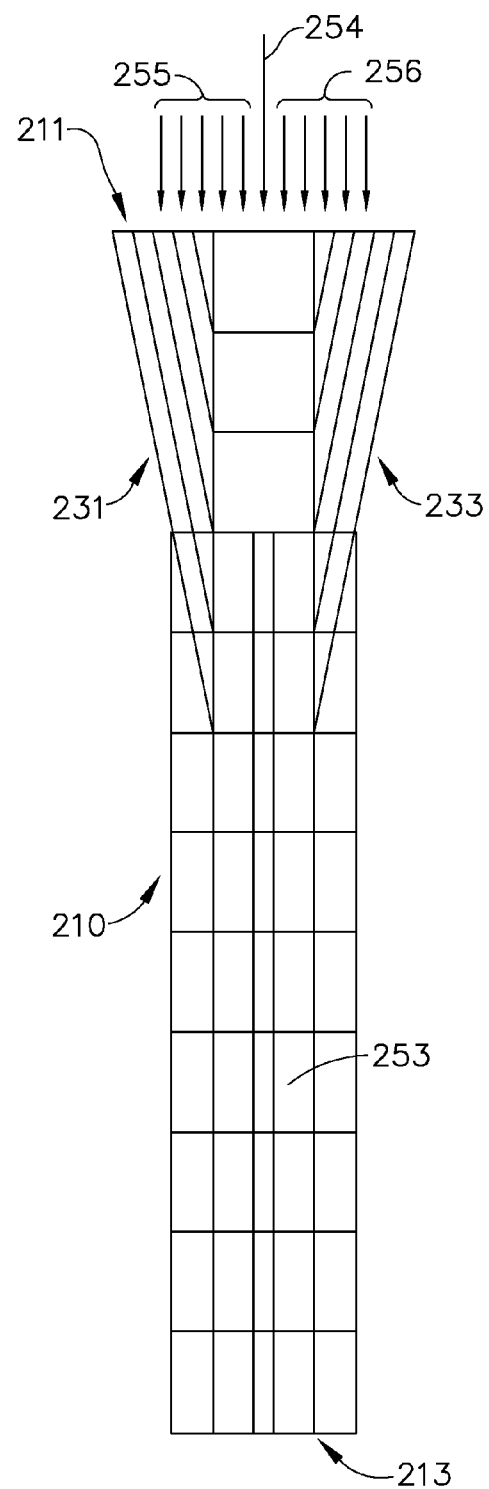
FIG. 32 is a diagram of the cooling hole of FIG. 26 which illustrates a method manufacture; and, FIG. 33 is a flow chart depicting the method of forming the cooling hole.
Figure 33:
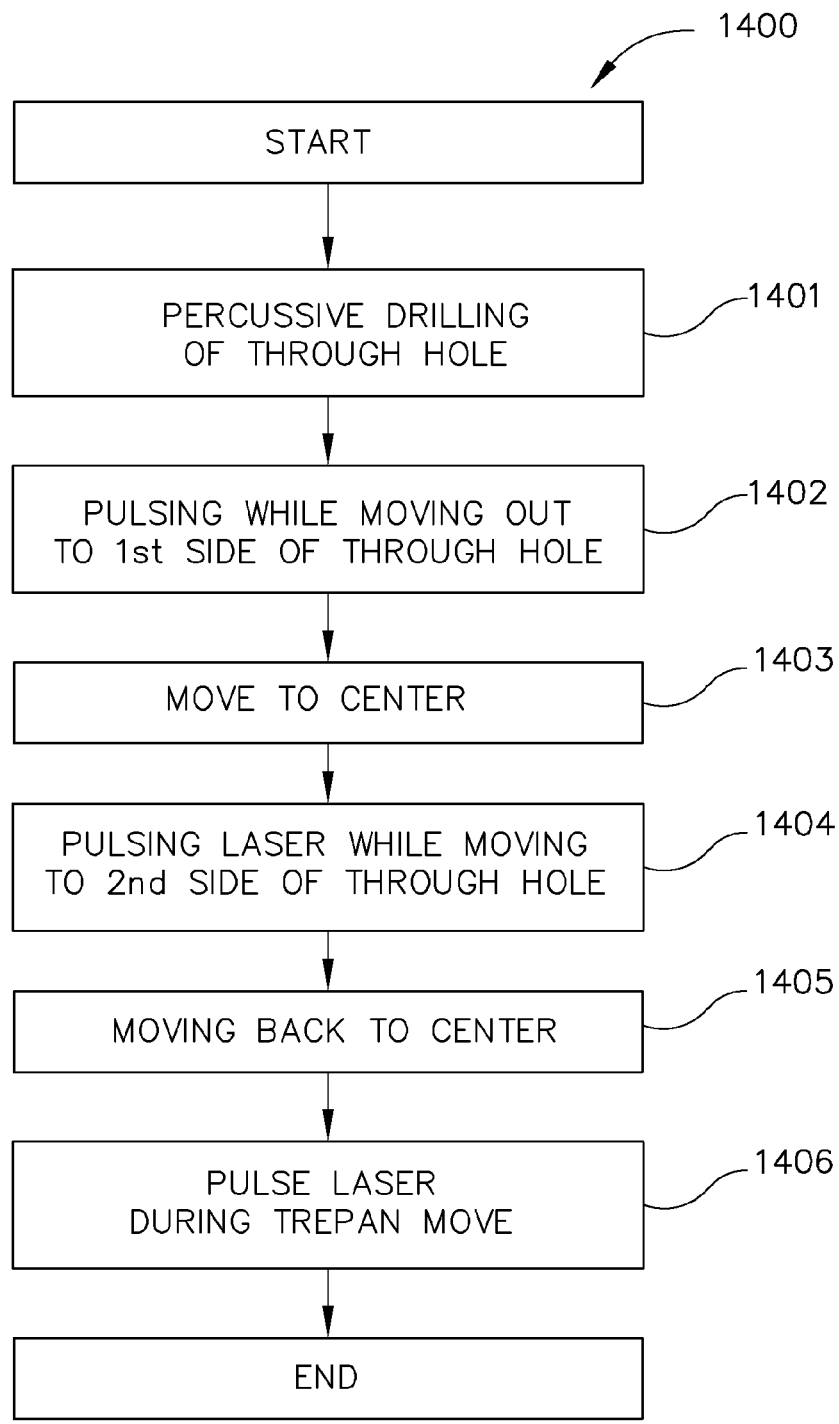

Referring now to FIGS. 32, 33 a method comprised of one or more steps 1401, 1402, 1403, 1404, 1405 and 1406 which, unless otherwise indicated, may be performed in any suitable order and/or combination. An embodiment that is a method starts by initiating a pre-determined sequence and a pattern of laser shots 254, 255, 256 that impinge the substrate 220, for example a combustor liner for a gas turbine engine. According to the illustrated embodiment, the laser shots are generally parallel to each other and the sequence of laser shots form the central bore 253 as well as the wings 231, 233. The bore 253 is formed from the exit surface 237 through the substrate 220 according to some embodiments but may alternatively be formed from the inlet surface 236 of the substrate 220.

Referring first to FIG. 32, a diagram of an embodiment of the shaped cooling hole 210 is depicted having an inlet 213, a bore 253 and an outlet 211. Depicted above the hole are a plurality of arrows 255, 256. The arrows 255, 256 represent laser shots utilized to form the cooling holes 210. The following description is provided in combination with the steps set forth in FIG. 33 which describes method 1400. In step 1401, a percussive laser drilling is utilized to form a through hole in the substrate 220 (FIG. 26). The percussive drilling may include multiple shots 254 from a laser. Next, a series of laser shots 255 are pulsed while moving the laser toward a first side of the through hole formed in step 1402.

At step 1403, the laser is moved to the center position. Next, at step 1404, the pulsing laser fires a series of shots 256 toward a second side of the hole while moving through. The laser is then moved back to center at step 1405. The wings 231, 233 are formed during the steps 1402, 1404 by controlling pulsing of the laser so as to only pass partially through the substrate 220. The wings 231, 233 are depicted with angled lines relative to the center bore 253. The angle of the transition between the transition point and the outlet 211 is created in part because the laser shots 255, 256 only partially overlap substrate 220 adjacent the bore 253 resulting in uneven ablation and angled surfaces in wings 231, 233. Next, at step 1406 the laser will pulse during a trepan move along a programmed path in order to control size and shape of the final aperture. A trepan move is one wherein the laser pulses while moving along a programmed path. Of course, it is well within the scope of the instant embodiments that the laser may pulse while the substrate is moved. The path may include multiple passes if required to achieve a desired degree of control. The path may also include dwells at programmed locations. The process ends after step 1406.

Types of Substrates and/or Objects Including them

Depending on the embodiment, the substrate 20 referenced above is one of a combustor liner for a turbine, a combustor liner for a gas turbine, a combustor liner for a gas turbine engine, a combustor liner "can", an afterburner liner, a metal testing coupon, or the like. Accordingly, embodiments of the claimed invention encompass any of such items individually. Embodiments of the claimed invention also encompass items such as, but not limited to, an engine, a turbine or a vehicle having as an element or component thereof a substrate with one or more shaped cooling holes formed therein.

In one embodiment, the turbine is a gas turbine. Such a gas turbine is either a gas turbine engine or a gas producer core. Non-limiting examples of a gas turbine engine are a turbojet, a turbofan, a turboprop and a turboshaft. Non-limiting examples of a gas producer core are: a turbogenerator, a turbo water pump, a jet dryer, a snow melter, a turbocompressor, and the like.

Embodiments of the claimed invention also encompass a vehicle having a turbine which has as an element or component thereof a substrate with one or more shaped cooling holes 10 formed therein. In such an embodiment, the turbine is a gas turbine engine, such as but not limited to: a turbojet, a turbofan, a turboprop and a turboshaft. Examples of vehicles having a gas turbine engine include, but are not limited to: an aircraft, a hovercraft, a locomotive, a marine vessel, a ground vehicle, and the like.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims. In particular, although claims are made regarding specific methods of using laser pulses to drill embodiments of the shaped cooling holes described, shown and/or claimed herein, other methods using electro-discharge machining, waterjets, or other material removal mechanisms are understood to be alternative ways of achieving substantially the same function and/or result.

What is claimed is:

1. A method of forming a cooling aperture, comprises:
   drilling a center bore at a preselected angle from an exit surface toward an inlet surface through a substrate;
   pulsing a laser, a first series while moving one of said laser and said substrate in a first direction relative to a center line of said bore;
   stopping said pulsing said laser said first series and moving said one of said laser and said substrate;
   pulsing said laser and second series while moving said one of said laser and said substrate in a second direction relative to said center line of said bore;
   stopping said pulsing said laser said second series and moving said one of said laser and said substrate;
   trepanning said laser to form a substantially oval shaped inlet.

2. The method of forming a cooling aperture of claim 1, forming an oval shaped outlet with a larger area than said substantially oval shaped inlet.

3. The method of forming a cooling aperture of claim 1, forming a transition point in said bore.

* * * * *